United States Patent
Galpin et al.

(10) Patent No.: US 11,076,166 B2
(45) Date of Patent: Jul. 27, 2021

(54) METHOD AND APPARATUS FOR MOTION VECTOR PREDICTOR ADAPTATION FOR OMNIDIRECTIONAL VIDEO

(71) Applicant: INTERDIGITAL VC HOLDINGS, INC., Wilmington, DE (US)

(72) Inventors: Franck Galpin, Cesson-Sevigne (FR); Tangi Poirier, Cesson-Sevigne (FR); Edouard Francois, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/647,663

(22) PCT Filed: Sep. 14, 2018

(86) PCT No.: PCT/US2018/051081
§ 371 (c)(1),
(2) Date: Mar. 16, 2020

(87) PCT Pub. No.: WO2019/055782
PCT Pub. Date: Mar. 21, 2019

(65) Prior Publication Data
US 2020/0275110 A1    Aug. 27, 2020

(30) Foreign Application Priority Data

Sep. 18, 2017    (EP) .................................... 17306198

(51) Int. Cl.
*H04N 19/33*    (2014.01)
*H04N 19/105*   (2014.01)
(Continued)

(52) U.S. Cl.
CPC .......... *H04N 19/33* (2014.11); *H04N 19/105* (2014.11); *H04N 19/137* (2014.11); *H04N 19/176* (2014.11); *H04N 19/31* (2014.11)

(58) Field of Classification Search
CPC .... H04N 19/33; H04N 19/105; H04N 19/137; H04N 19/176; H04N 19/31; H04N 19/70;
(Continued)

(56) References Cited

U.S. PATENT DOCUMENTS 9,288,501 B2    3/2016    Zheng et al.
9,407,929 B2    8/2016    Park et al.
(Continued)

FOREIGN PATENT DOCUMENTS

WO    WO2016076680    5/2016

OTHER PUBLICATIONS

Li et al., Projection Based Advanced Motion Model for Cubic Mapping for 360-Degree Video, Aug. 2017, IEEE ICIP, pp. 1427-1431 (Year: 2017).*

(Continued)

*Primary Examiner* — Marnie A Matt
(74) *Attorney, Agent, or Firm* — Jamie T. Nguyen

(57) ABSTRACT

A method and apparatus adapts motion vector prediction for suitability to omnidirectional video. One embodiment improves handling of temporal motion vector predictors or rescaled motion vector predictors. Another embodiment is suited to spatial motion vector predictors, and another to a combination of either temporal or spatial motion vector predictors. The method analyzes a scale factor derived from, at least one of, the time index of the predictor, the time index of the reference image's predictor, the time index of a reference image's current block, and the time index of the current block. If, for example, the scale factor is greater than one, motion vector transformation is performed before (Continued)

motion vector rescaling. If, however, the scale factor is less than or equal to one, the motion vector rescaling is performed before motion vector transformation.

19 Claims, 18 Drawing Sheets

(51) Int. Cl.
*H04N 19/137* (2014.01)
*H04N 19/176* (2014.01)
*H04N 19/31* (2014.01)

(58) Field of Classification Search
CPC .... H04N 19/51; H04N 19/513; H04N 19/154; H04N 19/174; H04N 19/527; H04N 19/597
USPC .................................................. 375/240.24
See application file for complete search history.

(56) References Cited

U.S. PATENT DOCUMENTS

| 9,516,344 | B2 | 12/2016 | Misra et al. | |
|---|---|---|---|---|
| 9,571,830 | B2 | 2/2017 | Song et al. | |
| 2014/0301463 | A1* | 10/2014 | Rusanovskyy | H04N 19/39 375/240.14 |
| 2015/0195566 | A1* | 7/2015 | Hinz | H04N 19/33 375/240.13 |
| 2016/0112489 | A1* | 4/2016 | Adams | H04L 65/605 375/240.01 |
| 2016/0112704 | A1* | 4/2016 | Grange | H04N 19/61 375/240.12 |
| 2017/0006284 | A1 | 1/2017 | Gokhale et al. | |
| 2017/0339426 | A1* | 11/2017 | Lee | H04N 19/182 |
| 2019/0200023 | A1* | 6/2019 | Hanhart | H04N 19/184 |

OTHER PUBLICATIONS

Ye et al., Algorithm Descriptions of Projection Format Conversion and Video Quality Metrics in 360Lib Version 4, 7. JVET Meeting, Jul. 13, 2017-Jul. 21, 2017, Torino, (The Joint Video Exploration Team of ISO/IEC JTC1/SC29/WG11 and ITU-Y SG.16), URL: http://phenix.int-evry.fr/jvet, No. JVET-G1003, Aug. 17, 2017.

Boyce, et al., HEVC Additional Supplemental Enhancement Information (Draft 3), 28. JCT-VC Meeting; Jul. 15, 2017-Jul. 21, 2017, Torino, (Joint Collaborative Team on Video Coding of ISO/IEC JTC1/SC29/WG11 and ITU-T SG.16), URL; http://wftp3.itu.int/av-arch/jctvc-site, No. JCTVC-AB1005, Sep. 11, 2017.

Van Der Auwera, et al., AHG8: ACP with Padding for 360-degree video, 7. JVET Meeting, Jul. 13, 2017-Jul. 21, 2017, Torino, (The Joint Video Exploration Team of SO/IEC JTC1/SC29/WG11 and ITU-T SG.16), URL: http://phenix.int-evry.fr/jvet, No. JVET-G0071-v2, Jul. 15, 2017.

Laroche, et al., RD Optimized Coding for Motion Vector Predictor Selection, IEEE Transactions on Circuits and Systems for Video Technology, Institute of Electrical and Electronics Engineers, USA, vol. 18, No. 9, Sep. 1, 2008, pp. 1247-1257.

Hanhart, et al., Interdigital's Response to the 360Ao Video Category in Joint Call for Evidence on Video Compression with Capability Beyond HEVC, 7. JVET Meeting, Jul. 13, 2017-Jul. 21, 2017, Torino, (The Joint Video Exploration Team of ISO/IEC JTC1/SC29/WG11 and ITU-T SG.16), URL: http://phenix.int-evry.fr/jvet, No. JVET-G0024, Jul. 6, 2017.

* cited by examiner

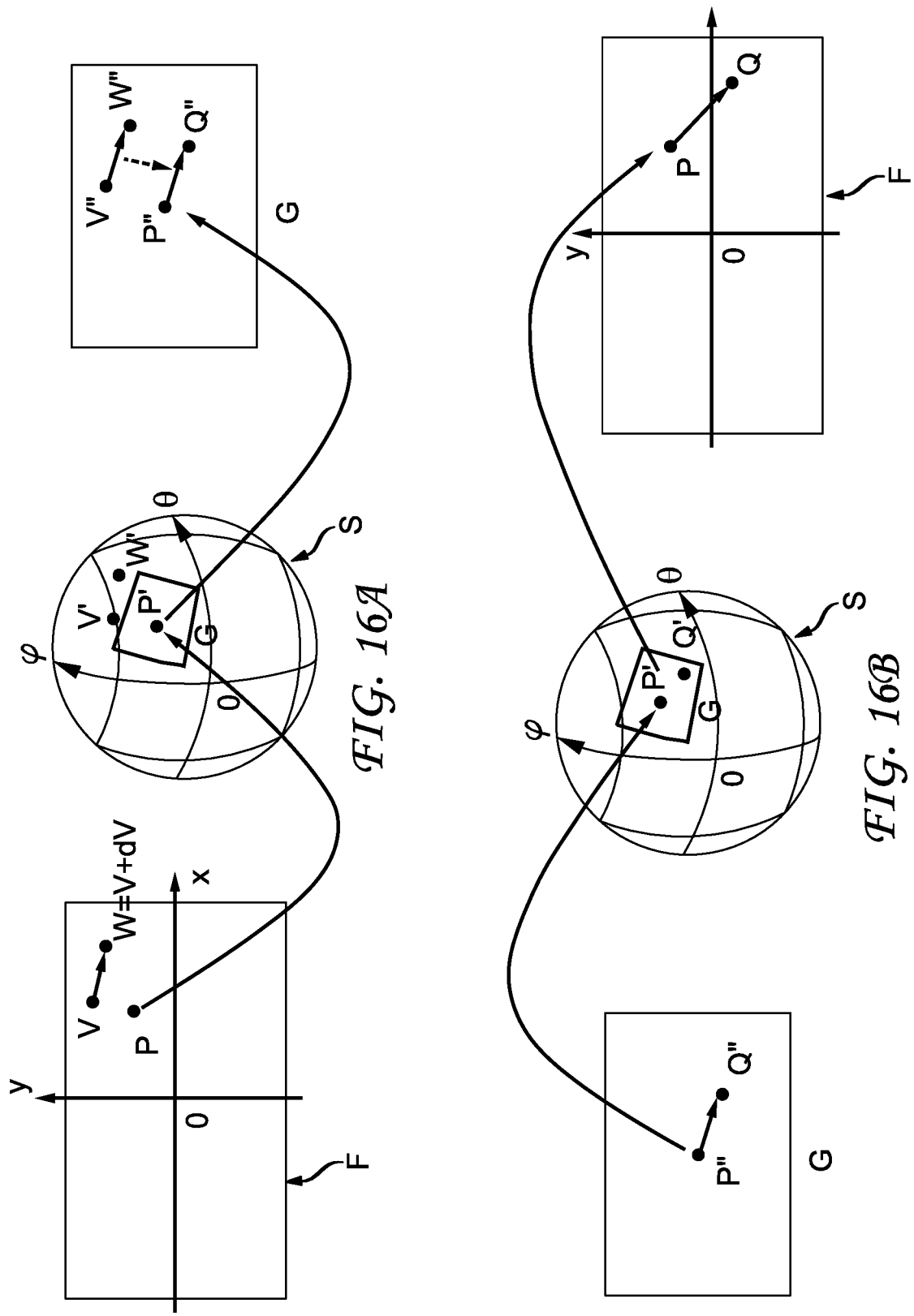

METHOD AND APPARATUS FOR MOTION VECTOR PREDICTOR ADAPTATION FOR OMNIDIRECTIONAL VIDEO

FIELD OF THE INVENTION

The following described aspects relate to the field of video compression generally and to the field of omnidirectional video, in particular.

BACKGROUND OF THE INVENTION

Recently there has been a growth of available large field of view content (up to 360°). Such content is potentially not fully visible by a user watching the content on immersive display devices such as Head Mounted Displays (HMD), smart glasses, PC screens, tablets, smartphones and the like. That means that at a given moment, a user may only be viewing a part of the content. However, a user can typically navigate within the content by various means such as head movement, mouse movement, touch screen, voice and the like. It is typically desirable to encode and decode this content.

SUMMARY OF THE INVENTION

These and other drawbacks and disadvantages of the prior art are addressed by at least one of the described embodiments, which are directed to a method and apparatus for improving the compression efficiency of video encoders and decoders through increased precision of motion vectors.

In at least one embodiment, there is provided a method. The method comprises steps of computing a scale factor for a motion vector predictor of a block of a picture: performing motion vector rescaling and motion vector transformation on the motion vector predictor, in an order based on the scale factor; performing motion compensation on the block of a picture using the transformed and rescaled motion vector predictor; and, encoding the motion compensated block of video data.

In at least one other embodiment, there is provided a method. The method comprises steps of computing a scale factor for a motion vector predictor of a block of a picture; performing motion vector rescaling and motion vector transformation on the motion vector predictor, in an order based on the scale factor; performing motion compensation on the block of a picture using the transformed and rescaled motion vector predictor; and, decoding the motion compensated block of video data.

In another embodiment, there is provided a method according to any of the aforementioned methods, wherein the method is used in either frame rate up conversion, advanced motion vector prediction, advanced temporal motion vector prediction, or any combination of these motion compensation techniques.

In another embodiment, there is provided an apparatus. The apparatus comprises a memory and a processor. The processor is configured to perform any variation of the aforementioned method embodiments.

According to another aspect described herein, there is provided a nontransitory computer readable storage medium containing data content generated according to the method of any one of the aforementioned method embodiments, or by the apparatus of any one of the aforementioned apparatus embodiments for playback using a processor.

According to another aspect described herein, there is provided a signal comprising video data generated according to the method of any one of the aforementioned method embodiments for coding a block of video data, or by the apparatus of any one of the aforementioned apparatus embodiments for coding a block of video data, for playback using a processor.

According to another aspect described herein, there is provided a computer program product comprising instructions which, when the program is executed by a computer, cause the computer to carry out the method of any one of the aforementioned method embodiments.

These and other aspects, features and advantages of the present principles will become apparent from the following detailed description of exemplary embodiments, which is to be read in connection with the accompanying drawings.

BRIEF DESCRIPTION OF THE DRAWINGS

FIGS. 16A and 16B illustrate mapping from a frame coordinate to rendered frame, and from a rendered frame to an encoded frame.

DETAILED DESCRIPTION

Figure 1:
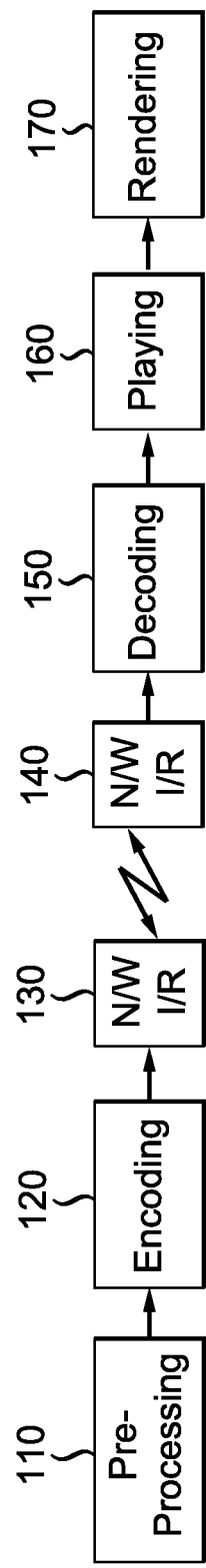
FIG. 1 illustrates an exemplary system for encoding and decoding omnidirectional videos, according to a specific and non-limiting embodiment.

Omnidirectional content is usually projected on a given layout, so that the final content to encode/decode fits in a rectangular frame, which is convenient for processing by existing codecs. Depending on the mapping, geometric distortions might be introduced which can hurt the compression performance. Especially, the motion vector prediction might not be adapted when dealing with equi-rectangular (ERP) mapping. The following embodiments can be extended to other mappings with similar properties as well.

At least one of the embodiments described is used in designing new motion vector prediction adapted to ERP mapping. Several improvements are made upon prior techniques, notably a better way to handle temporal motion vector predictor or a rescaled motion vector predictor.

A large field of view content may be, among others, a three-dimension computer graphic imagery scene (3D CGI scene), a point cloud or an immersive video. Many terms might be used to design such immersive videos such as for example Virtual Reality (VR), 360, panoramic, 4π, steradians, immersive, omnidirectional, large field of view.

An immersive video typically refers to a video encoded on a rectangular frame that is a two-dimension array of pixels (i.e., element of color information) like a "regular" video. In many implementations, the following processes may be performed. To be rendered, the frame is, first, mapped on the inner face of a convex volume, also called mapping surface (e.g., a sphere, a cube, a pyramid), and, second, a part of this volume is captured by a virtual camera. Images captured by the virtual camera are rendered on the screen of the immersive display device. A stereoscopic video is encoded on one or two rectangular frames, projected on two mapping surfaces which are combined to be captured by two virtual cameras according to the characteristics of the device.

Pixels may be encoded according to a mapping function in the frame. The mapping function may depend on the mapping surface. For a same mapping surface, several mapping functions are possible. For example, the faces of a cube may be structured according to different layouts within the frame surface. A sphere may be mapped according to an equirectangular projection or to a gnomonic projection for example. The organization of pixels resulting from the selected projection function modifies or breaks lines continuities, orthonormal local frame, pixel densities and introduces periodicity in time and space. These are typical features that are used to encode and decode videos. Existing encoding and decoding methods usually do not take specificities of immersive videos into account. Indeed, as immersive videos can be 360° videos, a panning, for example, introduces motion and discontinuities that require a large amount of data to be encoded while the content of the scene does not change. Taking immersive videos specificities into account while encoding and decoding video frames would bring valuable advantages to the encoding or decoding methods.

FIG. 1 illustrates a general overview of an encoding and decoding system according to a specific and non-limiting embodiment. The system of FIG. 1 is a functional system. A pre-processing module 110 may prepare the content for encoding by the encoding device 120. The pre-processing module 110 may perform multi-image acquisition, merging of the acquired multiple images in a common space (typically a 3D sphere if we encode the directions), and mapping of the 3D sphere into a 2D frame using, for example, but not limited to, an equirectangular mapping or a cube mapping. The pre-processing module 110 may also accept an omnidirectional video in a particular format (for example, equirectangular) as input, and pre-processes the video to change the mapping into a format more suitable for encoding. Depending on the acquired video data representation, the pre-processing module 110 may perform a mapping space change.

The encoding device 120 and the encoding method will be described with respect to other figures of the specification. After being encoded, the data, which may encode immersive video data or 3D CGI encoded data for instance, are sent to a network interface 130, which can be typically implemented in any network interface, for instance present in a gateway. The data are then transmitted through a communication network, such as internet but any other network can be foreseen. Then the data are received via network interface 140. Network interface 140 can be implemented in a gateway, in a television, in a set-top box, in a head mounted display device, in an immersive (projective) wall or in any immersive video rendering device.

After reception, the data are sent to a decoding device 150. Decoding function is one of the processing functions described in the following FIGS. 2 to 12. Decoded data are then processed by a player 160. Player 160 prepares the data for the rendering device 170 and may receive external data from sensors or users input data. More precisely, the player 160 prepares the part of the video content that is going to be displayed by the rendering device 170. The decoding device 150 and the player 160 may be integrated in a single device (e.g., a smartphone, a game console, a set-top box (STB), a tablet, a computer, etc.). In other embodiments, the player 160 may be integrated in the rendering device 170.

Several types of systems may be envisioned to perform the decoding, playing and rendering functions of an immersive display device, for example when rendering an immersive video.

A first system, for processing augmented reality, virtual reality, or augmented virtuality content is illustrated in FIGS. 2 to 6. Such a system comprises processing functions, an immersive video rendering device which may be a head mounted display (HMD), a tablet or a smartphone for example and may comprise sensors. The immersive video rendering device may also comprise additional interface modules between the display device and the processing functions. The processing functions can be performed by one or several devices. They can be integrated into the immersive video rendering device or they can be integrated into one or several processing devices. The processing device comprises one or several processors and a communication interface with the immersive video rendering device, such as a wireless or wired communication interface.

The processing device can also comprise a second communication interface with a wide access network such as internet and access content located on a cloud, directly or through a network device such as a home or a local gateway. The processing device can also access a local storage through a third interface such as a local access network interface of Ethernet type. In an embodiment, the processing device may be a computer system having one or several processing units. In another embodiment, it may be a smartphone which can be connected through wired or wireless links to the immersive video rendering device or which can be inserted in a housing in the immersive video rendering device and communicating with it through a connector or wirelessly as well. Communication interfaces of the processing device are wireline interfaces (for example a bus interface, a wide area network interface, a local area network interface) or wireless interfaces (such as a IEEE 802.11 interface or a Bluetooth® interface).

When the processing functions are performed by the immersive video rendering device, the immersive video rendering device can be provided with an interface to a network directly or through a gateway to receive and/or transmit content.

In another embodiment, the system comprises an auxiliary device which communicates with the immersive video rendering device and with the processing device. In such an embodiment, this auxiliary device can contain at least one of the processing functions.

The immersive video rendering device may comprise one or several displays. The device may employ optics such as lenses in front of each of its display. The display can also be a part of the immersive display device like in the case of smartphones or tablets. In another embodiment, displays and optics may be embedded in a helmet, in glasses, or in a visor that a user can wear. The immersive video rendering device may also integrate several sensors, as described later on. The immersive video rendering device can also comprise several interfaces or connectors. It might comprise one or several wireless modules in order to communicate with sensors, processing functions, handheld or other body parts related devices or sensors.

The immersive video rendering device can also comprise processing functions executed by one or several processors and configured to decode content or to process content. By processing content here, it is understood all functions to prepare a content that can be displayed. This may comprise, for instance, decoding a content, merging content before displaying it and modifying the content to fit with the display device.

One function of an immersive content rendering device is to control a virtual camera which captures at least a part of the content structured as a virtual volume. The system may comprise pose tracking sensors which totally or partially track the user's pose, for example, the pose of the user's head, in order to process the pose of the virtual camera. Some positioning sensors may track the displacement of the user. The system may also comprise other sensors related to environment for example to measure lighting, temperature or sound conditions. Such sensors may also be related to the users' bodies, for instance, to measure sweating or heart rate. Information acquired through these sensors may be used to process the content. The system may also comprise user input devices (e.g., a mouse, a keyboard, a remote control, a joystick). Information from user input devices may be used to process the content, manage user interfaces or to control the pose of the virtual camera. Sensors and user input devices communicate with the processing device and/or with the immersive rendering device through wired or wireless communication interfaces.

Using FIGS. 2 to 6, several embodiments are described of this first type of system for displaying augmented reality, virtual reality, augmented virtuality or any content from augmented reality to virtual reality.

Figure 2:
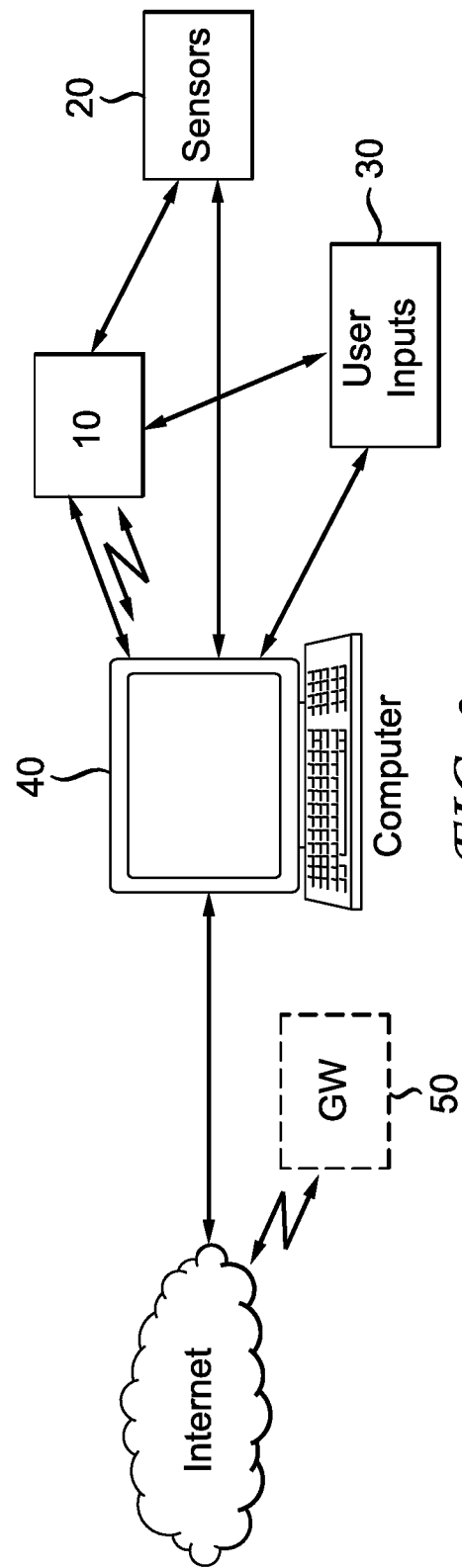
FIGS. 2-6 illustrate a system configured to decode, process and render immersive videos according to various embodiments.

FIG. 2 illustrates a particular embodiment of a system configured to decode, process and render immersive videos. The system comprises an immersive video rendering device 10, sensors 20, user inputs devices 30, a computer 40 and a gateway 50 (optional).

Figure 10:
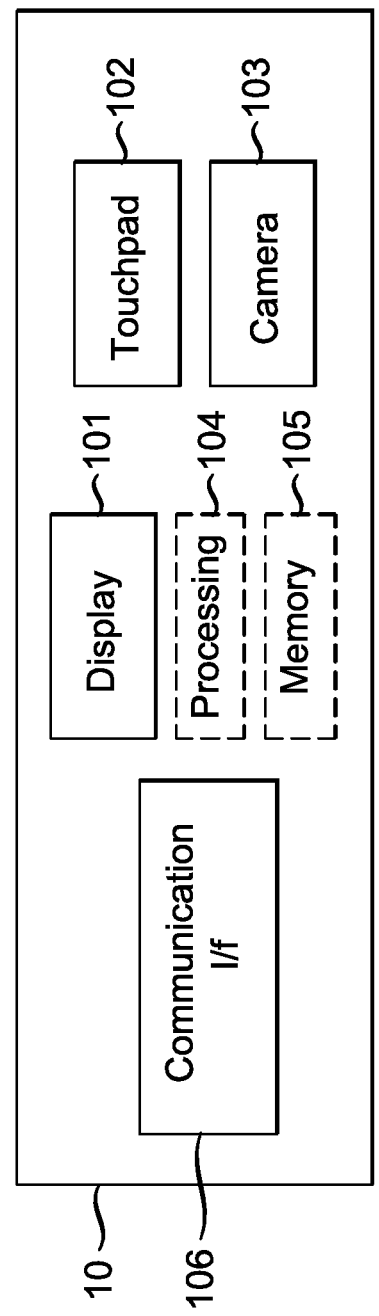
FIGS. 10-12 represent immersive video rendering devices according to various embodiments.

The immersive video rendering device 10, illustrated in FIG. 10, comprises a display 101. The display is, for example of OLED or LCD type. The immersive video rendering device 10 is, for instance a HMD, a tablet or a smartphone. The device 10 may comprise a touch surface 102 (e.g., a touchpad or a tactile screen), a camera 103, a memory 105 in connection with at least one processor 104 and at least one communication interface 106. The at least one processor 104 processes the signals received from the sensors 20.

Some of the measurements from sensors are used to compute the pose of the device and to control the virtual camera. Sensors used for pose estimation are, for instance, gyroscopes, accelerometers or compasses. More complex systems, for example using a rig of cameras may also be used. In this case, the at least one processor performs image processing to estimate the pose of the device 10. Some other measurements are used to process the content according to environment conditions or user's reactions. Sensors used for observing environment and users are, for instance, microphones, light sensor or contact sensors. More complex systems may also be used like, for example, a video camera tracking user's eyes. In this case the at least one processor performs image processing to operate the expected measurement. Data from sensors 20 and user input devices 30 can also be transmitted to the computer 40 which will process the data according to the input of these sensors.

Memory 105 includes parameters and code program instructions for the processor 104. Memory 105 can also comprise parameters received from the sensors 20 and user input devices 30. Communication interface 106 enables the immersive video rendering device to communicate with the computer 40. The communication interface 106 of the processing device may be wireline interfaces (for example a bus interface, a wide area network interface, a local area network interface) or wireless interfaces (such as a IEEE 802.11 interface or a Bluetooth® interface).

Computer 40 sends data and optionally control commands to the immersive video rendering device 10. The computer 40 is in charge of processing the data, i.e., prepare them for display by the immersive video rendering device 10. Processing can be done exclusively by the computer 40 or part of the processing can be done by the computer and part by the immersive video rendering device 10. The computer 40 is connected to internet, either directly or through a gateway or network interface 50. The computer 40 receives data representative of an immersive video from the internet, processes these data (e.g., decodes them and possibly prepares the part of the video content that is going to be displayed by the immersive video rendering device 10) and sends the processed data to the immersive video rendering device 10 for display. In another embodiment, the system may also comprise local storage (not represented) where the data representative of an immersive video are stored, said local storage can be on the computer 40 or on a local server accessible through a local area network for instance (not represented).

Figure 3:
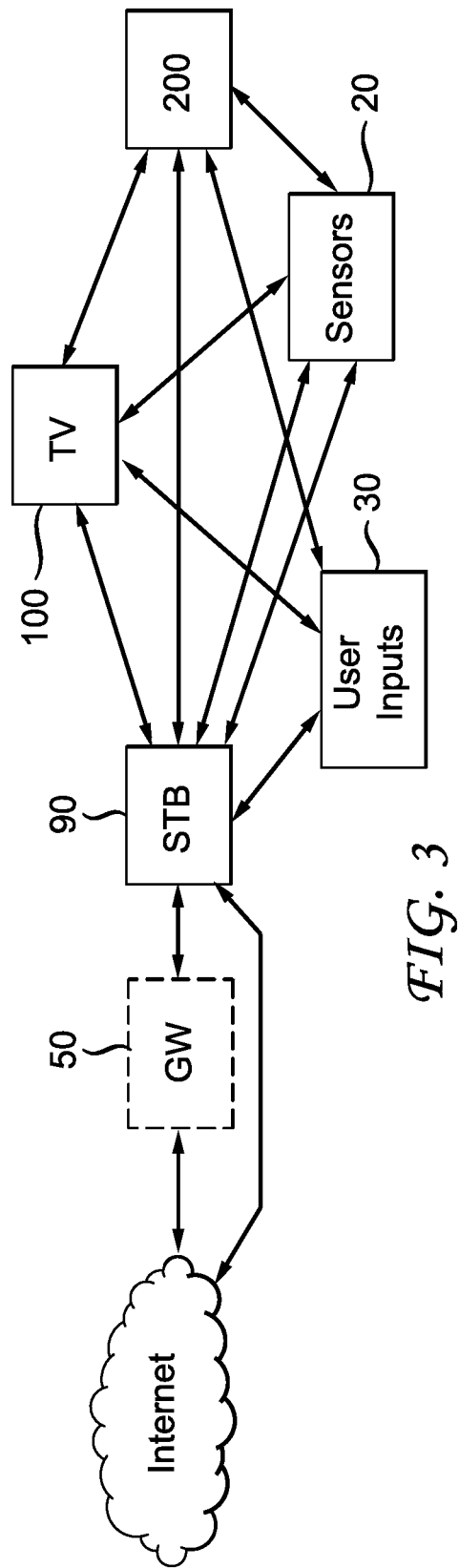

FIG. 3 represents a second embodiment. In this embodiment, a STB 90 is connected to a network such as internet directly (i.e., the STB 90 comprises a network interface) or via a gateway 50. The STB 90 is connected through a wireless interface or through a wired interface to rendering devices such as a television set 100 or an immersive video rendering device 200. In addition to classic functions of a STB, STB 90 comprises processing functions to process video content for rendering on the television 100 or on any immersive video rendering device 200. These processing functions are the same as the ones that are described for computer 40 and are not described again here. Sensors 20 and user input devices 30 are also of the same type as the ones described earlier with regards to FIG. 2. The STB 90 obtains the data representative of the immersive video from the internet. In another embodiment, the STB 90 obtains the data representative of the immersive video from a local storage (not represented) where the data representative of the immersive video are stored.

Figure 4:
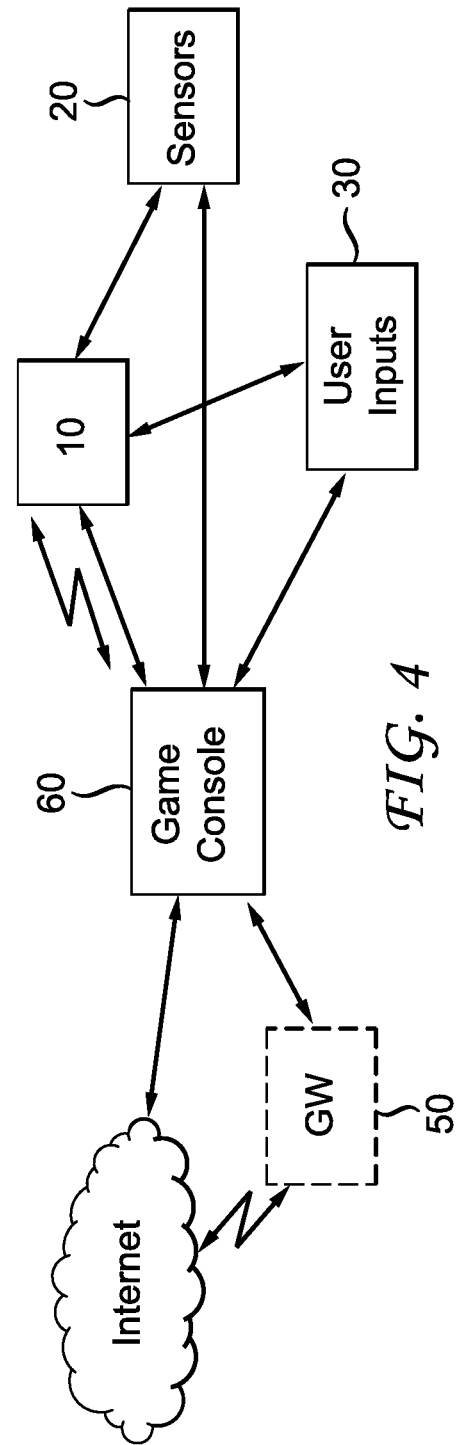

FIG. 4 represents a third embodiment related to the one represented in FIG. 2. The game console 60 processes the content data. Game console 60 sends data and optionally control commands to the immersive video rendering device 10. The game console 60 is configured to process data representative of an immersive video and to send the processed data to the immersive video rendering device 10 for display. Processing can be done exclusively by the game console 60 or part of the processing can be done by the immersive video rendering device 10.

The game console 60 is connected to internet, either directly or through a gateway or network interface 50. The game console 60 obtains the data representative of the immersive video from the internet. In another embodiment, the game console 60 obtains the data representative of the immersive video from a local storage (not represented) where the data representative of the immersive video are stored, said local storage can be on the game console 60 or on a local server accessible through a local area network for instance (not represented).

The game console 60 receives data representative of an immersive video from the internet, processes these data (e.g., decodes them and possibly prepares the part of the video that is going to be displayed) and sends the processed data to the immersive video rendering device 10 for display. The game console 60 may receive data from sensors 20 and user input devices 30 and may use them to process the data representative of an immersive video obtained from the internet or from the from the local storage.

Figure 5:
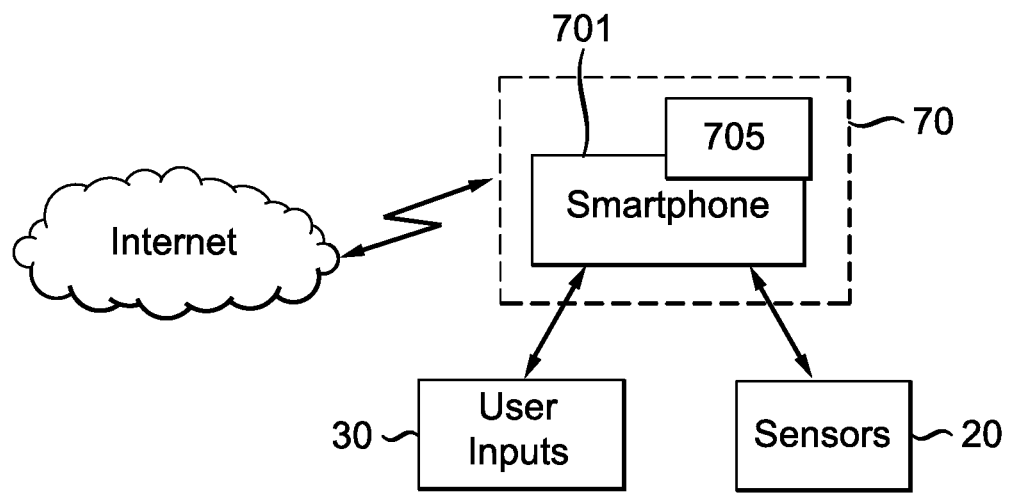

FIG. 5 represents a fourth embodiment of said first type of system where the immersive video rendering device 70 is formed by a smartphone 701 inserted in a housing 705. The smartphone 701 may be connected to internet and thus may obtain data representative of an immersive video from the internet. In another embodiment, the smartphone 701 obtains data representative of an immersive video from a local storage (not represented) where the data representative of an immersive video are stored, said local storage can be on the smartphone 701 or on a local server accessible through a local area network for instance (not represented).

Figure 11:
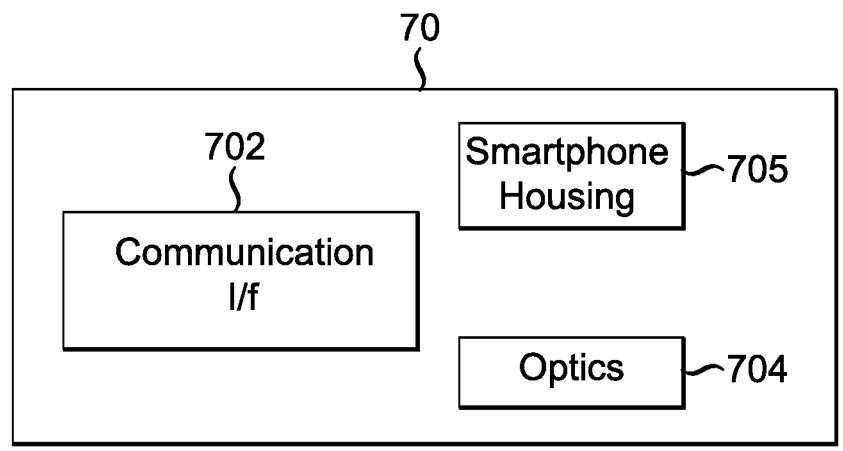

Immersive video rendering device 70 is described with reference to FIG. 11 which gives a preferred embodiment of immersive video rendering device 70. It optionally comprises at least one network interface 702 and the housing 705 for the smartphone 701. The smartphone 701 comprises all functions of a smartphone and a display. The display of the smartphone is used as the immersive video rendering device 70 display. Therefore, no display other than the one of the smartphone 701 is included. However, optics 704, such as lenses, are included for seeing the data on the smartphone display. The smartphone 701 is configured to process (e.g., decode and prepare for display) data representative of an immersive video possibly according to data received from the sensors 20 and from user input devices 30. Some of the measurements from sensors are used to compute the pose of the device and to control the virtual camera. Sensors used for pose estimation are, for instance, gyroscopes, accelerometers or compasses. More complex systems, for example using a rig of cameras may also be used. In this case, the at least one processor performs image processing to estimate the pose of the device 10. Some other measurements are used to process the content according to environment conditions or user's reactions. Sensors used for observing environment and users are, for instance, microphones, light sensor or contact sensors. More complex systems may also be used like, for example, a video camera tracking user's eyes. In this case the at least one processor performs image processing to operate the expected measurement.

Figure 6:
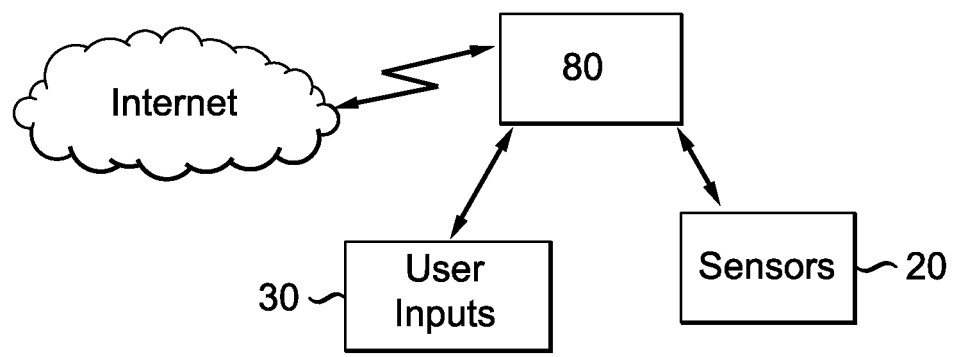

FIG. 6 represents a fifth embodiment of said first type of system in which the immersive video rendering device 80 comprises all functionalities for processing and displaying the data content. The system comprises an immersive video rendering device 80, sensors 20 and user input devices 30. The immersive video rendering device 80 is configured to process (e.g., decode and prepare for display) data representative of an immersive video possibly according to data received from the sensors 20 and from the user input devices 30. The immersive video rendering device 80 may be connected to internet and thus may obtain data representative of an immersive video from the internet. In another embodiment, the immersive video rendering device 80 obtains data representative of an immersive video from a local storage (not represented) where the data representative of an immersive video are stored, said local storage can be on the rendering device 80 or on a local server accessible through a local area network for instance (not represented).

Figure 12:
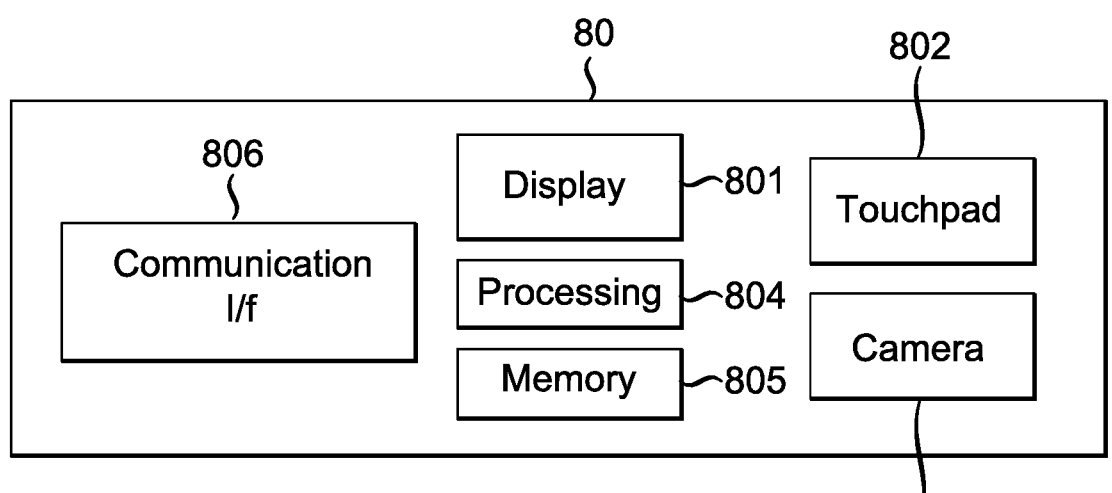

The immersive video rendering device 80 is illustrated in FIG. 12. The immersive video rendering device comprises a display 801. The display can be for example of OLED or LCD type. The device 80 may comprise a touch surface (optional) 802 (e.g., a touchpad or a tactile screen), a camera (optional) 803, a memory 805 in connection with at least one processor 804 and at least one communication interface 806. Memory 805 comprises parameters and code program instructions for the processor 804. Memory 805 can also comprise parameters received from the sensors 20 and user input devices 30. Memory can also be large enough to store the data representative of the immersive video content. For this several types of memories can exist and memory 805 can be a single memory or can be several types of storage (SD card, hard disk, volatile or non-volatile memory . . . ) Communication interface 806 enables the immersive video rendering device to communicate with internet network. The processor 804 processes data representative of the video in order to display them of display 801. The camera 803 captures images of the environment for an image processing step. Data are extracted from this step in order to control the immersive video rendering device.

Figure 7:
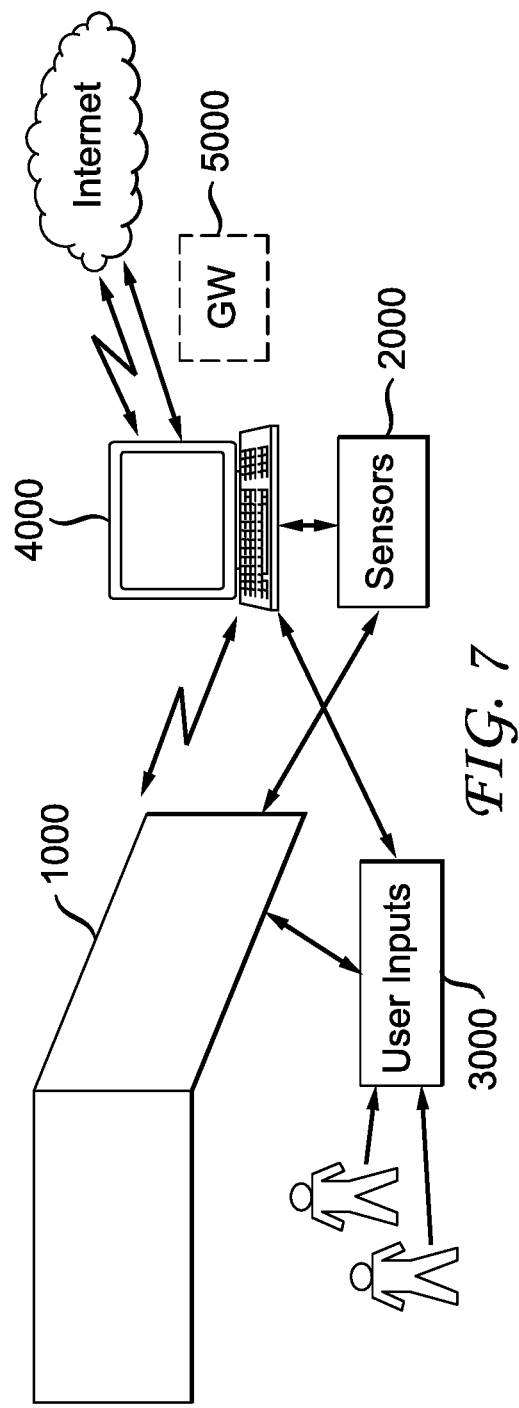
FIGS. 7-9 represents a system with an immersive wall configured to decode, process and render immersive videos according to various embodiments.
Figure 8:
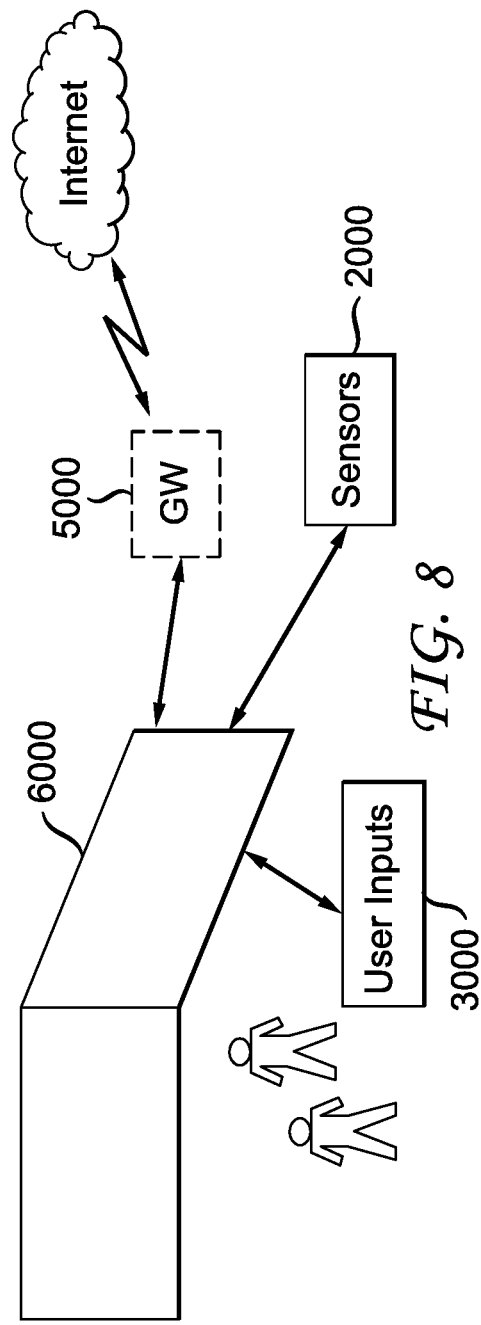
Figure 9:
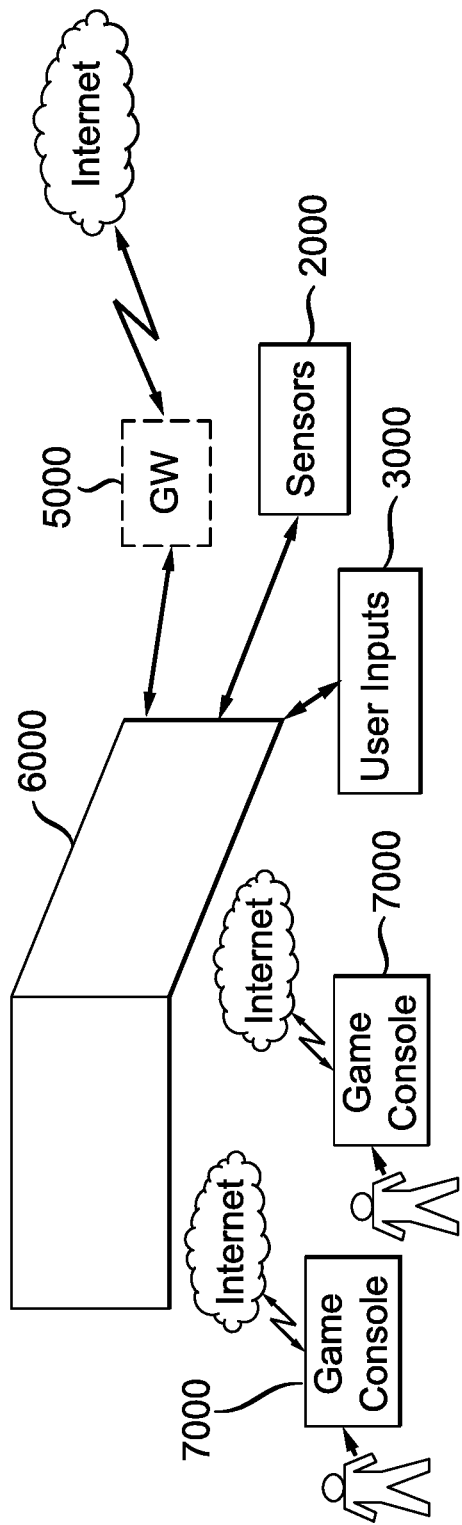

A second system, for processing augmented reality, virtual reality, or augmented virtuality content is illustrated in FIGS. 7 to 9. Such a system comprises an immersive wall.

FIG. 7 represents a system of the second type. It comprises a display 1000 which is an immersive (projective) wall which receives data from a computer 4000. The computer 4000 may receive immersive video data from the internet. The computer 4000 is usually connected to internet, either directly or through a gateway 5000 or network interface. In another embodiment, the immersive video data are obtained by the computer 4000 from a local storage (not represented) where the data representative of an immersive video are stored, said local storage can be in the computer 4000 or in a local server accessible through a local area network for instance (not represented).

This system may also comprise sensors 2000 and user input devices 3000. The immersive wall 1000 can be of OLED or LCD type. It can be equipped with one or several cameras. The immersive wall 1000 may process data received from the sensor 2000 (or the plurality of sensors 2000). The data received from the sensors 2000 may be related to lighting conditions, temperature, environment of the user, e.g., position of objects.

The immersive wall 1000 may also process data received from the user inputs devices 3000. The user input devices 3000 send data such as haptic signals in order to give feedback on the user emotions. Examples of user input devices 3000 are handheld devices such as smartphones, remote controls, and devices with gyroscope functions.

Sensors 2000 and user input devices 3000 data may also be transmitted to the computer 4000. The computer 4000 may process the video data (e.g., decoding them and preparing them for display) according to the data received from these sensors/user input devices. The sensors signals can be received through a communication interface of the immersive wall. This communication interface can be of Bluetooth type, of WiFi type or any other type of connection, preferentially wireless but can also be a wired connection.

Computer 4000 sends the processed data and optionally control commands to the immersive wall 1000. The computer 4000 is configured to process the data, i.e., preparing them for display, to be displayed by the immersive wall 1000. Processing can be done exclusively by the computer 4000 or part of the processing can be done by the computer 4000 and part by the immersive wall 1000.

FIG. 8 represents another system of the second type. It comprises an immersive (projective) wall 6000 which is configured to process (e.g., decode and prepare data for display) and display the video content. It further comprises sensors 2000, user input devices 3000.

The immersive wall 6000 receives immersive video data from the internet through a gateway 5000 or directly from internet. In another embodiment, the immersive video data are obtained by the immersive wall 6000 from a local storage (not represented) where the data representative of an immersive video are stored, said local storage can be in the immersive wall 6000 or in a local server accessible through a local area network for instance (not represented).

This system may also comprise sensors 2000 and user input devices 3000. The immersive wall 6000 can be of OLED or LCD type. It can be equipped with one or several cameras. The immersive wall 6000 may process data received from the sensor 2000 (or the plurality of sensors 2000). The data received from the sensors 2000 may be related to lighting conditions, temperature, environment of the user, e.g., position of objects.

The immersive wall 6000 may also process data received from the user inputs devices 3000. The user input devices 3000 send data such as haptic signals in order to give feedback on the user emotions. Examples of user input devices 3000 are handheld devices such as smartphones, remote controls, and devices with gyroscope functions.

The immersive wall 6000 may process the video data (e.g., decoding them and preparing them for display) according to the data received from these sensors/user input devices. The sensors signals can be received through a communication interface of the immersive wall. This communication interface can be of Bluetooth type, of WiFi type or any other type of connection, preferentially wireless but can also be a wired connection. The immersive wall 6000 may comprise at least one communication interface to communicate with the sensors and with internet.

FIG. 9 illustrates a third embodiment where the immersive wall is used for gaming. One or several gaming consoles 7000 are connected, preferably through a wireless interface to the immersive wall 6000. The immersive wall 6000 receives immersive video data from the internet through a gateway 5000 or directly from internet. In another embodiment, the immersive video data are obtained by the immersive wall 6000 from a local storage (not represented) where the data representative of an immersive video are stored, said local storage can be in the immersive wall 6000 or in a local server accessible through a local area network for instance (not represented).

Gaming console 7000 sends instructions and user input parameters to the immersive wall 6000. Immersive wall 6000 processes the immersive video content possibly according to input data received from sensors 2000 and user input devices 3000 and gaming consoles 7000 in order to prepare the content for display. The immersive wall 6000 may also comprise internal memory to store the content to be displayed.

Figure 13A:
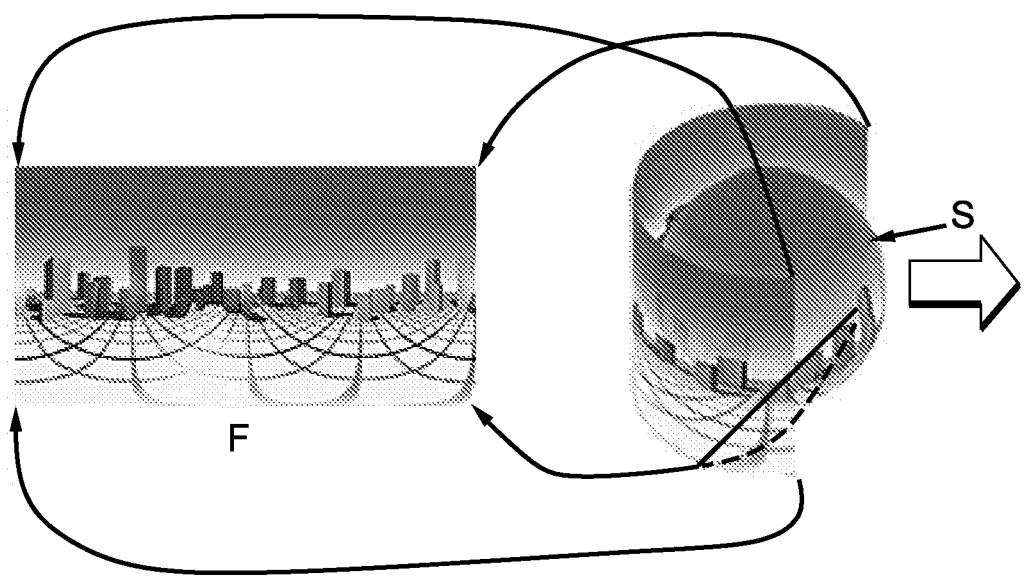
FIGS. 13A and 13B illustrate an example of projection from a spherical surface S onto a rectangular picture F.
Figure 13B:
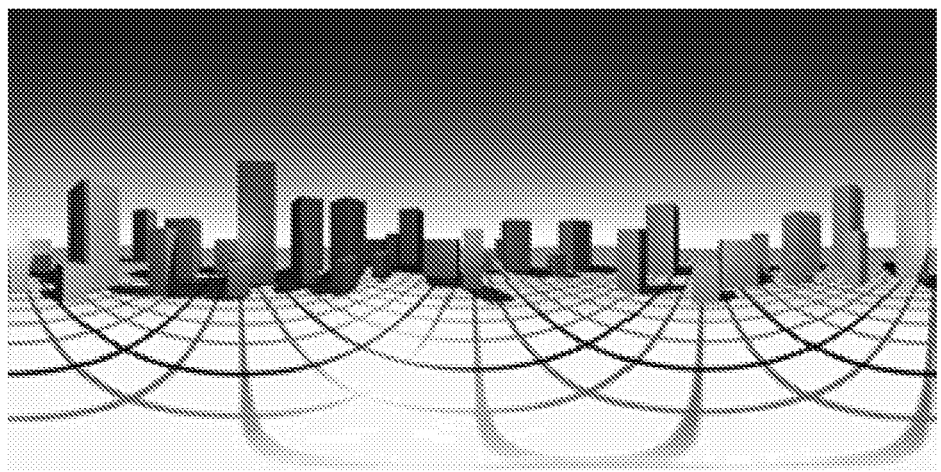
Figure 14A:
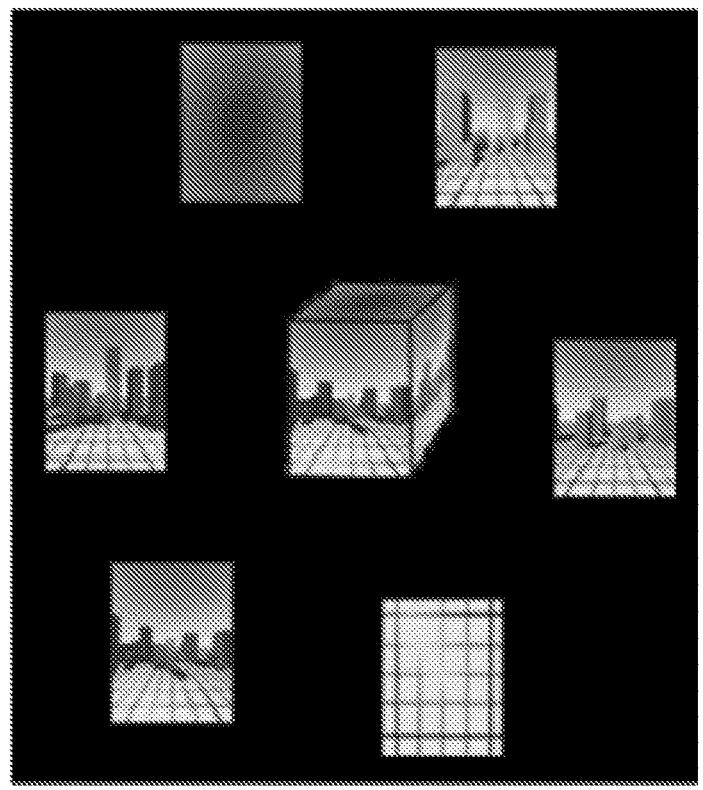
FIGS. 14A and 14B illustrate an example of projection from a cubic surface S onto six pictures, and a layout of the six faces of a cube projected on a two-dimensional (2D) picture.
Figure 14B:
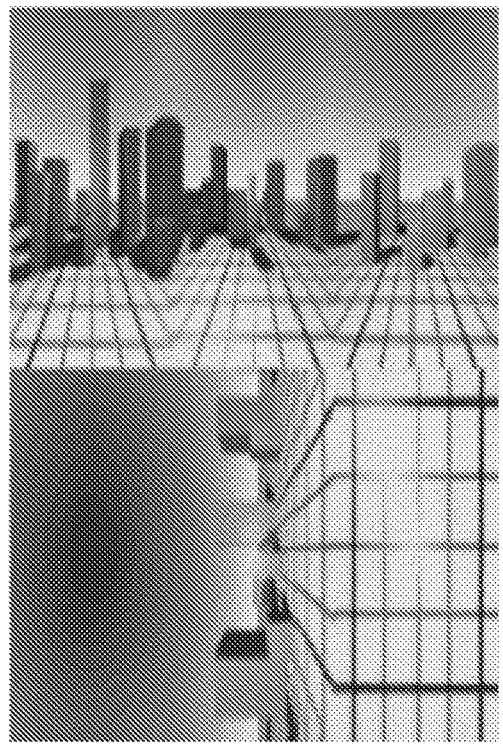

In one embodiment, we consider that the omnidirectional video is represented in a format that enables the projection of the surrounding 3D surface S onto a standard rectangular frame F that is represented in a format suitable for a video codec. Various projections can be used to project 3D surfaces to 2D surfaces. For example, FIG. 13A shows that an exemplary sphere surface S is mapped to a 2D frame F using an equi-rectangular projection, and FIG. 13B shows that an exemplary cube surface is mapped to a 2D frame using a cube mapping. Other mappings, such as pyramidal, icosahedral or octahedral mapping, can be used to map a 3D surface into a 2D frame.

The 2D frame F can then be encoded using existing video encoders, for example, encoders compliant with VP9, AV1, MPEG-2, H.264/AVC, or H.265/HEVC. The 2D frame F can also be encoded with an encoder adapted to the properties of omnidirectional videos, for example, using an adapted VP9, VP10, MPEG-2, H.264/AVC, or H.265/HEVC encoder. After encoding and decoding, the decoded 2D frame can be mapped back to the corresponding 3D surface, for example, a sphere for an equi-rectangular mapping or a cube for cube mapping. The 3D surface can then be projected onto a "virtual screen" corresponding to a user's viewpoint in order to obtain the final rendered frame. The steps of decoding the 2D frame and projecting from the 3D surface to a rendered frame can be merged into a single step, where a part of the decoded frame is mapped onto the rendered frame.

For simplicity of notation, the decoded 2D frame can also be referred to as "F," and the 3D surface used in rendering also as S. It should be understood that the 2D frame to be encoded and the 2D frame to be decoded may be different due to video compression, and the 3D surface in preprocessing and the 3D surface in rendering may also be different. The terms "mapping" and "projection" may be used interchangeably, the terms "pixel" and "sample" may be used interchangeably, and the terms "frame" and "picture" may be used interchangeably.

The problem of mapping a three-dimensional (3D) surface to a rectangular surface has first been described for a typical layout of omnidirectional video, the equirectangular layout, but the general principle is applicable to any mapping from the 3D surface S to the rectangular frame F. The same principle can apply for example to the cube mapping layout.

Figure 15A:
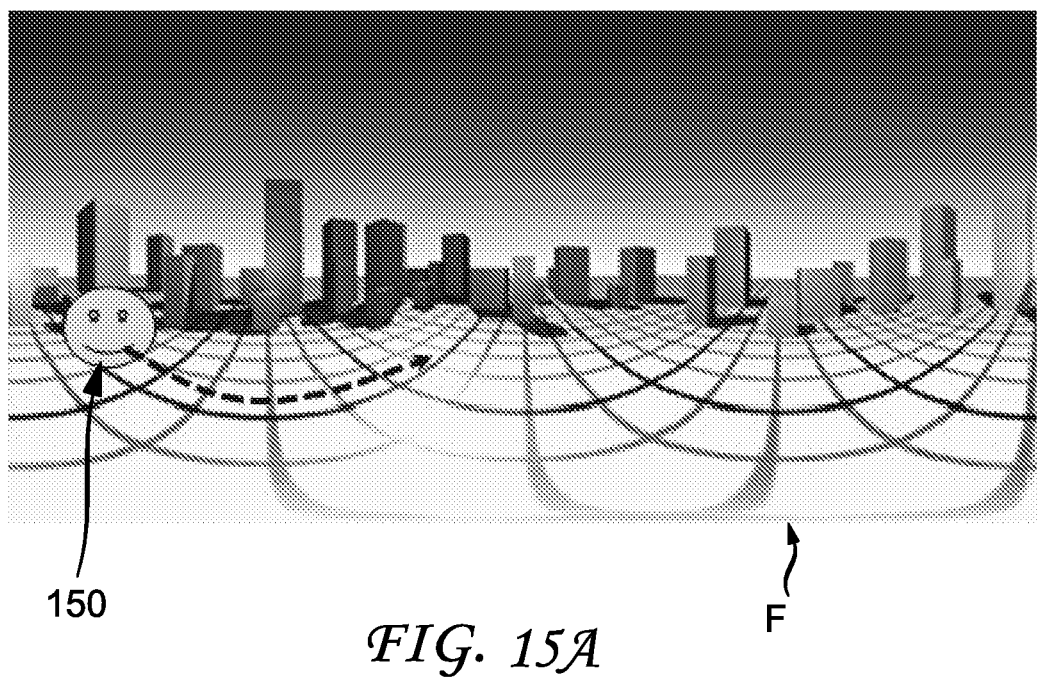
FIGS. 15A and 15B illustrate a moving object in a projected picture F of a three-dimensional (3D) surface representing an omnidirectional video, and corresponding motion vectors in a block partitioning of the projected picture.
Figure 15B:
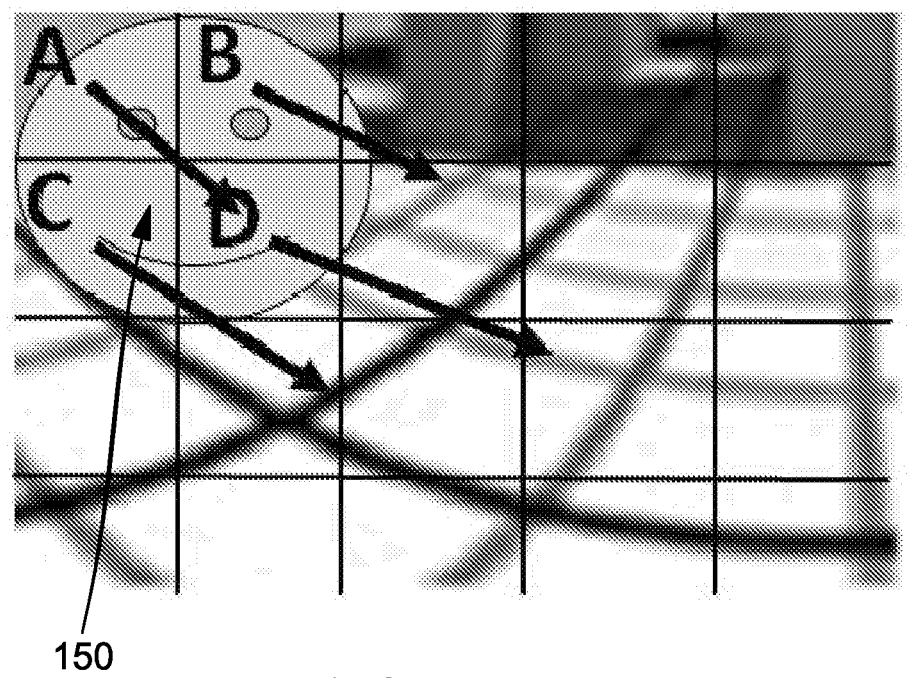

In FIGS. 15A and 15B, we show an example of an object moving along a straight line in the scene and the resulting apparent motion in the frame, shown by the dashed curve. The resulting motion vectors for an arbitrary Prediction Unit (PU) partition is shown on the right. As one can notice, even if the motion is perfectly straight in the rendered image, the frame to encode shows a non-uniform motion vector.

As the motion vector predictors are formed using the surrounding motion vectors, the predictors available to predict the motion vector of the block D are not suitable. For example, on the right figure, predicting motion of block D from motion of blocks A, B or C may not be suitable.

An approximate process to derivate the motion vector predictor from a neighboring motion vector is as follow, from notation in FIG. 16, which shows mapping from a frame coordinate system to a rendered frame and then from a rendered frame to an encoder frame:

P is the central point of the current CU for which we want to predict the motion vector
V is the central point of the neighbor CU from which we predict the motion vector
dV is the motion vector associated to the neighbor CU
1- Compute V'=3d(V), W'=3d(V+dV), dV'=W'−V'
2- Compute P'=3d(P) and Q'=P'+dV'
3- Compute Q=3d$^{-1}$(Q')
4- Compute dP=Q−P the predicted motion vector Another variant that produces a more accurate derivation of a motion vector predictor is as follows:

P is the central point of the current CU for which we want to predict the motion vector
V is the central point of the CU from which we predict the motion vector
dW is the motion vector associated to the neighbor CU
1- Compute P"=3d(P), note that P" is unitary and define a plane F normal to the direction P", passing through P"
2- Compute V"=3d(V)
3- Compute $$V^P = \frac{1}{P''.V''} V''$$

the projection of V" on the plane F
4- Compute W=V+dV
5- Compute W"=3d(W)
6- Compute $$W^P = \frac{1}{P''.W''} V''$$

the projection of W" on the plane F
7- Compute dV$^P$=W$^P$−V$^P$ the projection of motion vector on the plane F
8- Compute Q"=Q$^P$=P$^P$+dV$^P$=P"+dV$^P$
9- Compute Q=3d$^{-1}$(Q)
10- Compute the final motion vector dP=Q−P Define:

$$3d: M(x, y) \to M''(X, Y, Z) \quad \text{(eq1)}$$

$$M'' = \begin{bmatrix} \sin(\varphi)\cos(\theta) \\ \sin(\varphi)\sin(\theta) \\ \cos(\varphi) \end{bmatrix}$$

Where $$\theta = \frac{2\pi}{w} x$$

$$\varphi = \frac{\pi}{h} y$$

where w and h are the image width and height and x and y the pixel coordinates.

The pixel coordinates are in floating point here, that is:

$$x = \bar{x} + \frac{1}{2}, y = \bar{y} + \frac{1}{2}$$

Where $\bar{x}, \bar{y}$ are integer pixel coordinates.

The inverse function is defined as:

$$3d^{-1}: M''(X, Y, Z) \to M(x, y) \quad \text{eq.2}$$

$$\begin{cases} \theta = \operatorname{atan}\left(\frac{Y}{X}\right) \\ \varphi = \operatorname{atan}\left(\frac{\sqrt{X^2 + Y^2}}{Z}\right) \end{cases}$$

where $$x = \frac{w}{2\pi} \theta$$

$$y = \frac{h}{\pi} \varphi$$

One problem addressed by the described embodiments is motion vector prediction adapted to ERP mapping, although the general aspects can be applied to other mappings as well.

In HEVC, or in the experimental model Joint Exploration Model (JEM), motion vector predictors can be of two types. Spatial predictors come from neighboring blocks in the causal neighborhood of the current block to process. Temporal predictors, used in (A)TMVP ((Advanced) Temporal Motion Vector Prediction), or in uni-direction Frame Rate Up Conversion (FRUC/UniDir) come from blocks of another reference frame already decoded (see 180 in FIG. 18).

Figure 17:
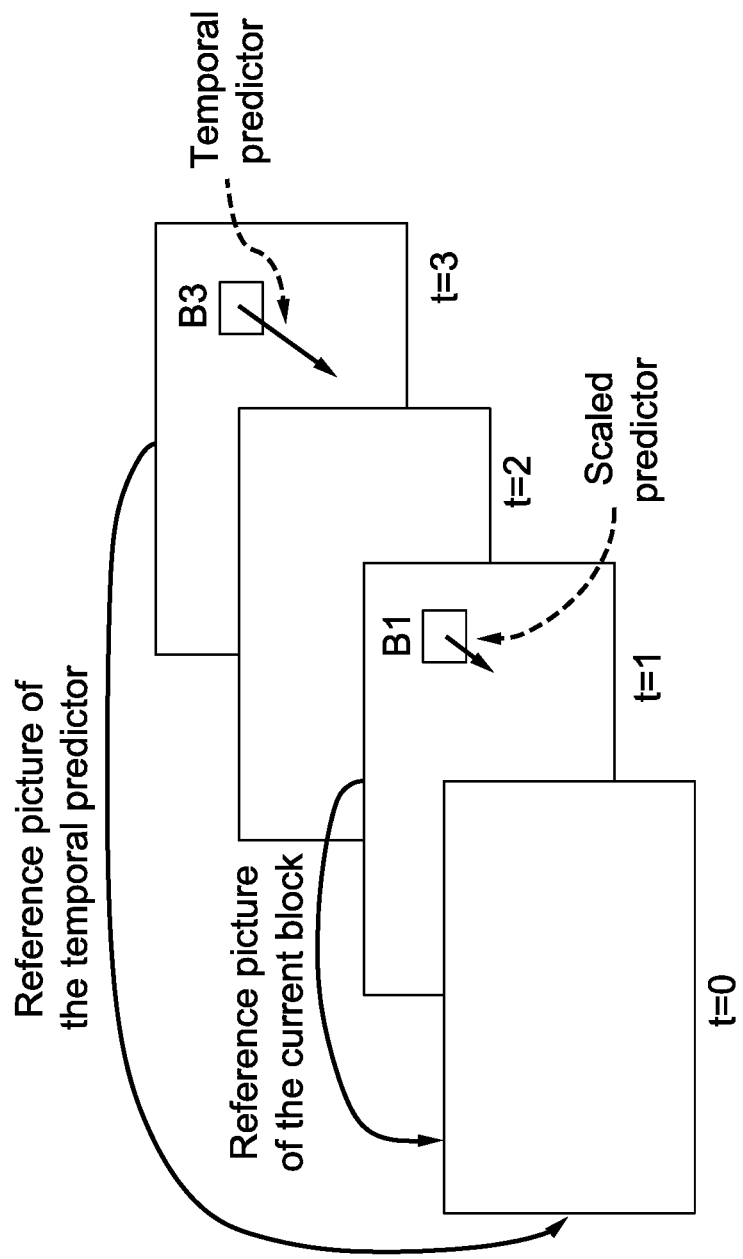
FIG. 17 illustrates an example of motion vector predictor scaling.

The embodiments described deal with issues arising with the rescaling of motion vectors. The HEVC standard describes temporal motion scaling in which the predictor is scaled in order to take into account the difference of time between current frame and reference frame. In FIG. 17, considering the frame at time t=1 as the current frame to process, the frame t=0 as the reference frame for the current block B1 to decode/encode, the frame at t=3 as the frame containing the block B3 used for the temporal motion vector prediction of block B1, and frame at t=0 the reference frame of the motion vector of block B3, the motion vector is downscaled by a factor of ⅓ to take into account the frame timing. Such downscaling needs to be taken into account in the ERP transformation process.

For Advanced Motion Vector Prediction (AMVP), the motion vectors can be rescaled the same way if the reference picture of the predictor block is not the same as the one of the current block.

Similarly, in case of ATMVP (-EXT), several rescalings are performed, both to compute the initial "temporal motion vector" from spatial neighbors and to adapt the scale of the collocated sub-PU motion vectors.

Figure 18:
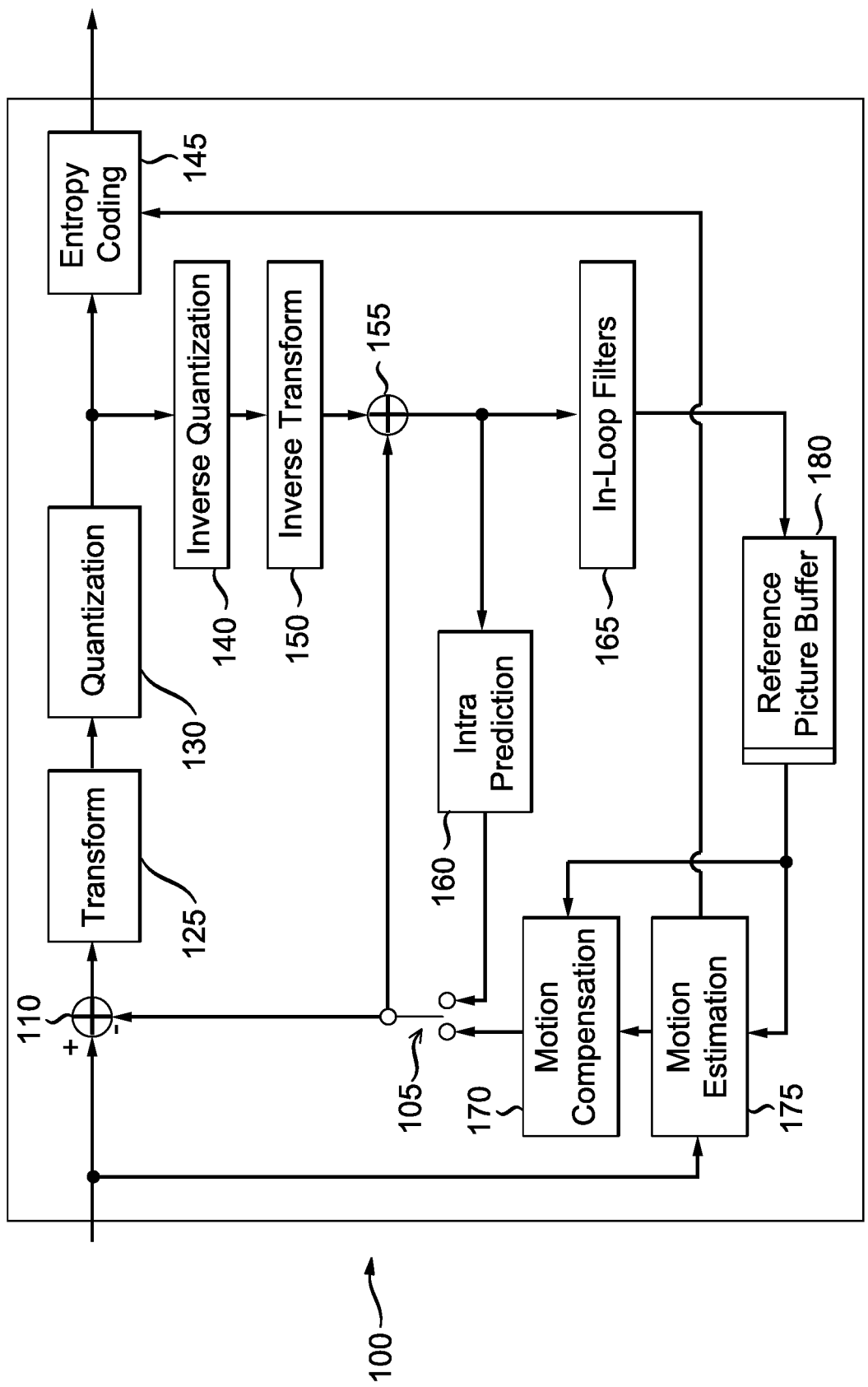
FIG. 18 illustrates an example of an encoder to which the described aspects can be applied.
Figure 19:
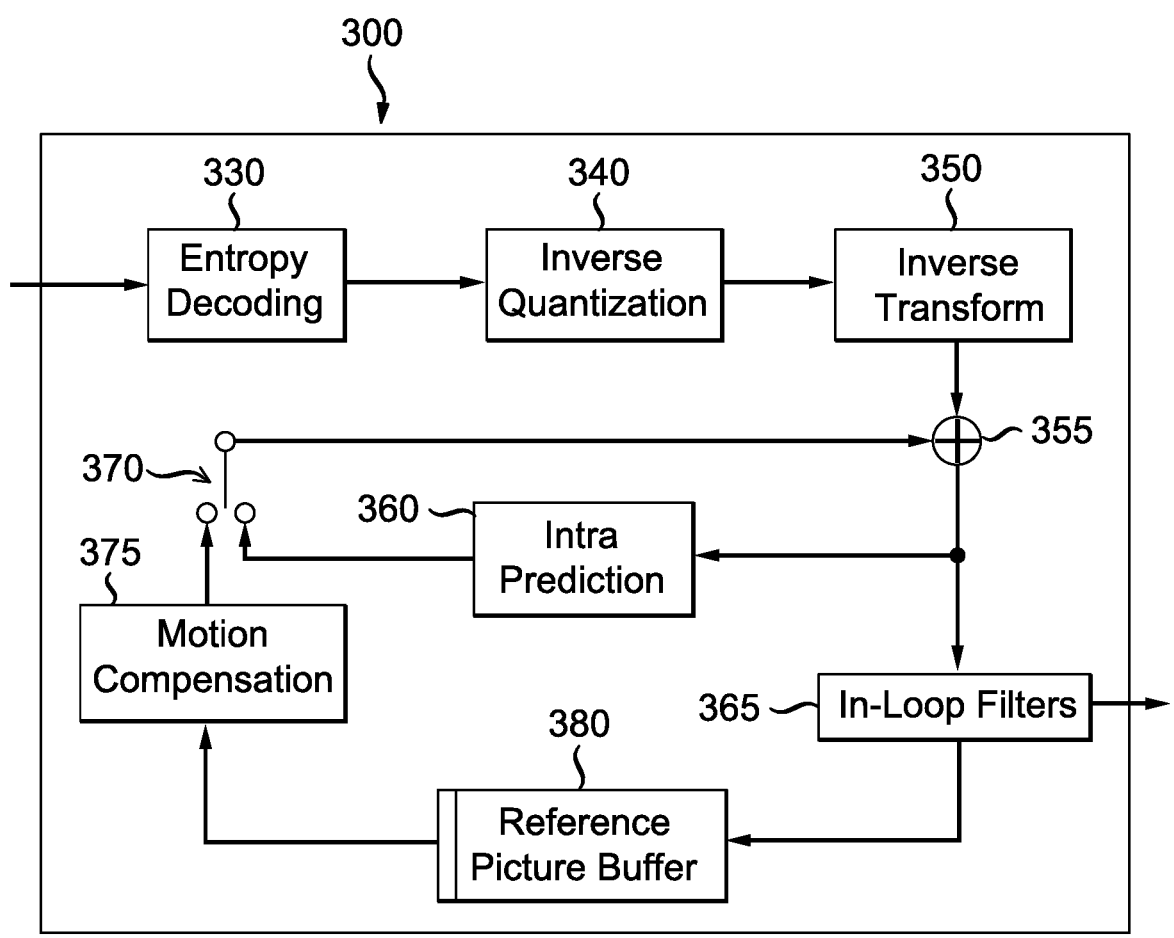
FIG. 19 illustrates an example of a decoder to which the described aspects can be applied.

The described embodiments can occur, for example, during the motion compensation process (170 in the encoder, FIG. 18 and 375 in the decoder, FIG. 19). More specifically, the process can take place during the motion vector(s) prediction stage.

Figure 20:
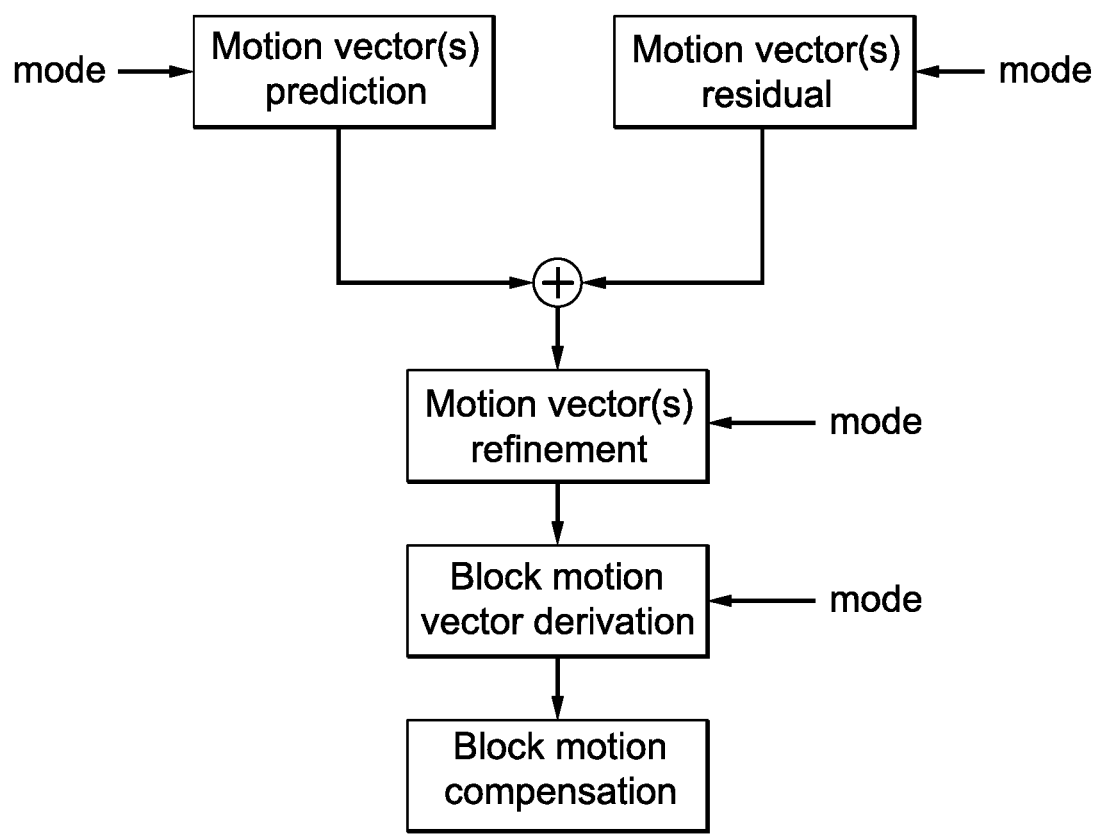
FIG. 20 illustrates an example of further detail in a motion compensation block.

FIG. 20 shows a more detailed view of the motion compensation process. For example, the JEM software has the following characteristics. For motion vector prediction, depending on the mode, one or several predictors are available, coming from both spatial neighboring blocks and temporal blocks. If in MERGE or SKIP mode is not being used, a motion vector residual is sent to refine the predictor. If FRUC mode or BIO is used, the initial motion vector is refined. If FRUC or AFFINE mode is used, a motion vector per sub blocks is derived or refined.

In ATMVP and ATMP-EXT (Extension of Advanced Temporal Motion Vector Predictor (ATMVP)), the motion vector prediction process can be summarized as:
1- Find a spatial neighbor having a motion vector
2- Rescale this predictor the same way it is done for TMVP motion vector predictor
3- Use this temporal motion vector to find a temporal motion vector from the motion compensated co-located sub-blocks of the current block.

In ATMVP-EXT, the motion vector is further processed to be averaged with spatial motion vector predictor.

The current embodiments change the motion vector prediction process. The described embodiments allow for improvement of the transformed ERP motion vector and thus improve the performance of the overall video compression scheme.

Based on the reasoning as described in applications mentioned above, one can notice that the geometrical adaptation of the motion vector predictor is more valid for smaller vectors. It is proposed here to perform commutation of the scaling and the transformation process based on the scale factor applied to the motion vector predictor.

In one embodiment, if the scale factor is less than or equal 1, for example, the rescaling is done first and the motion vector transformation is done after. If not, the transformation is done first and the scaling after.

In another embodiment, the scaling is always done first. The rationale is that the motion vector, for regular GOP structures in Random Access mode, are more likely to be downscaled (scale factor less than 1) than to be upscaled. Other scale factor values can be used.

Figure 21:
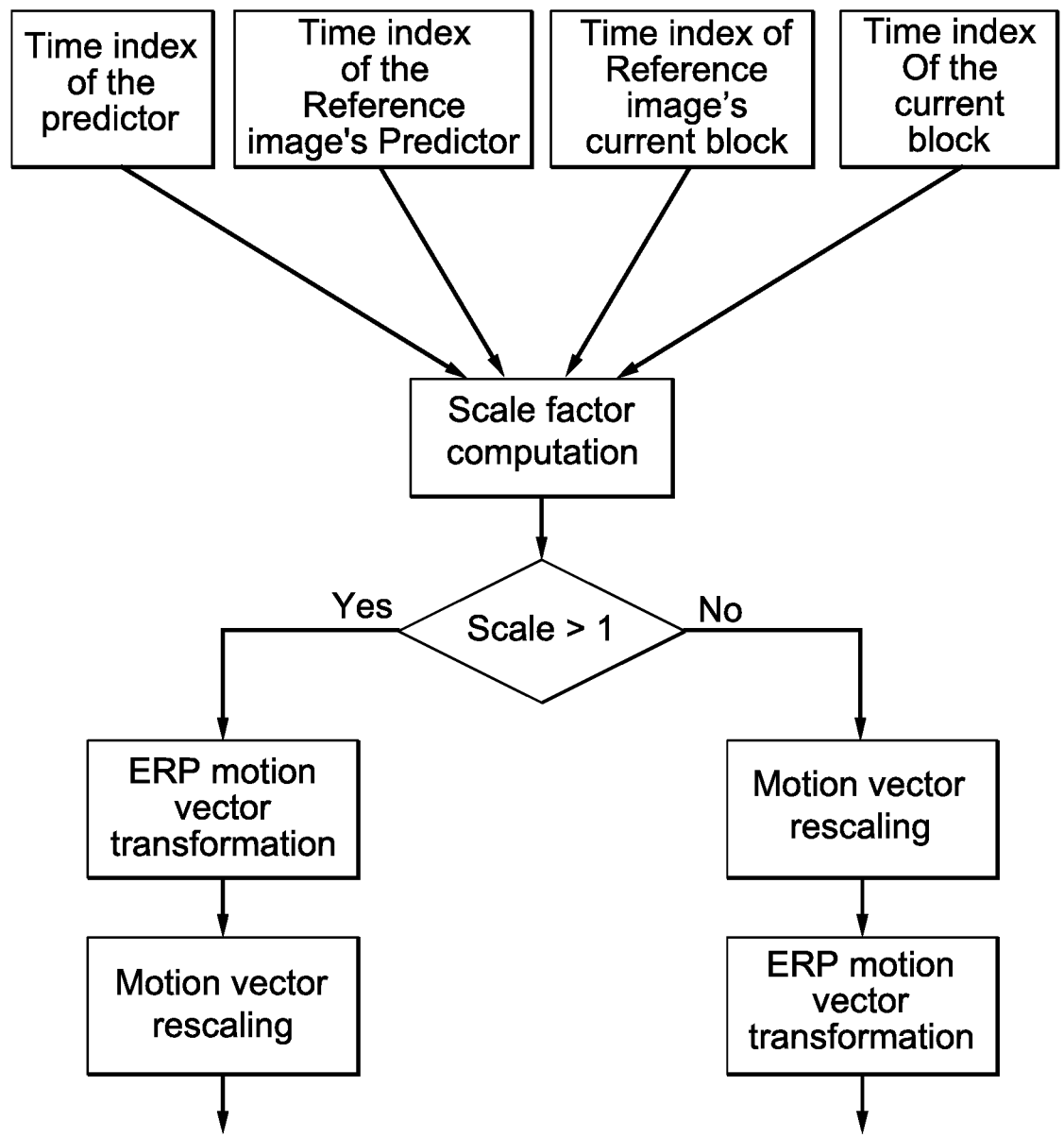
FIG. 21 illustrates an example of a flow diagram for motion vector transform/rescaling according to the described aspects.

In FIG. 21, the ERP motion vector transformation is the one described in the applications mentioned. Note that this process can apply for AMVP, TMVP, ATMVP, ATMVP-EXT or FRUC/UniDir motion vector rescaling. For AMVP, the predictor and current block time index are the same. For an ATMVP initial "temporal vector", the predictor and current block time index are the same. For ATMVP and ATMVP-EXT, the co-located sub-PU motion vector predictor are also rescaled.

Figure 22:
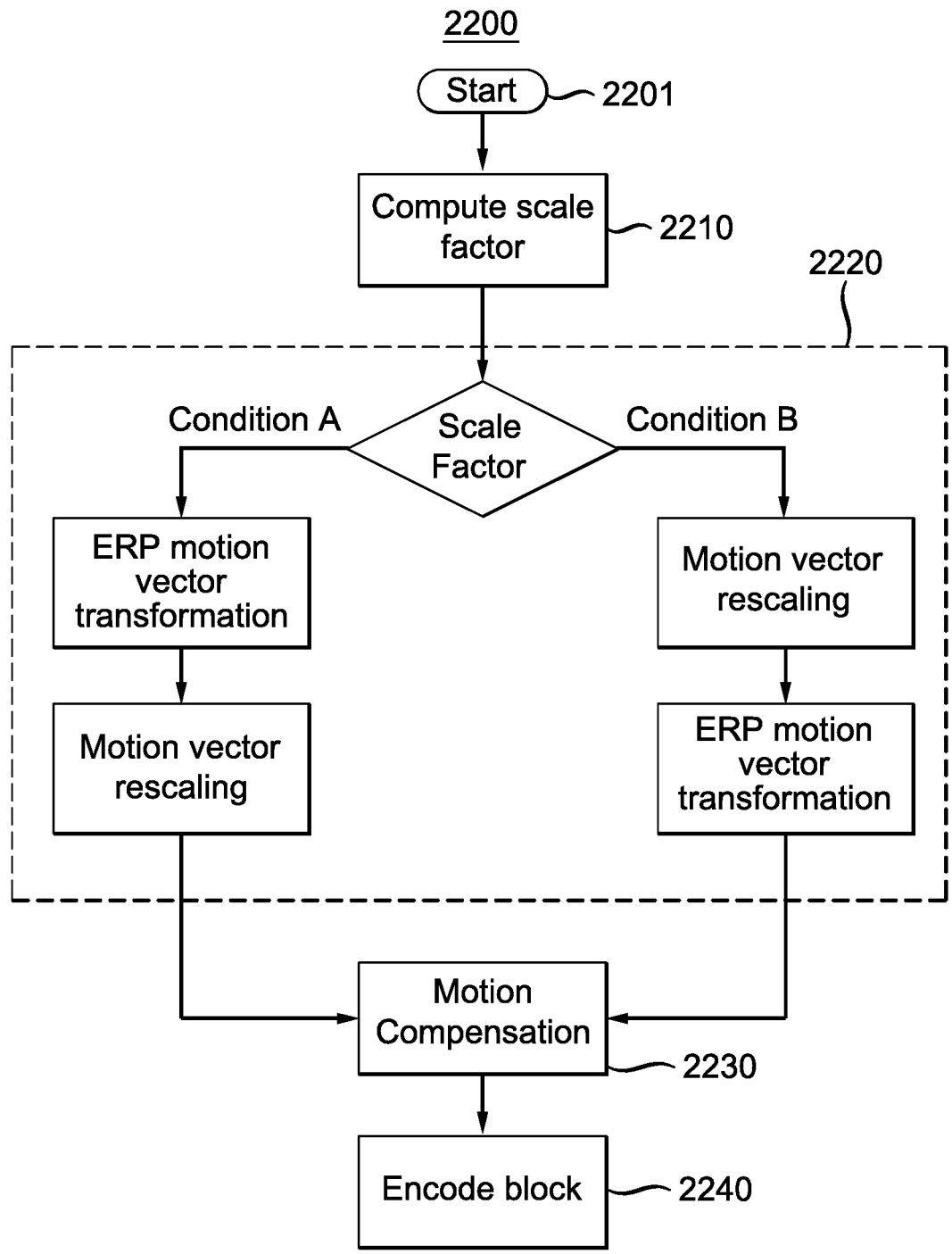
FIG. 22 illustrates one embodiment of an encoding method according to the described aspects.

FIG. 22 shows one embodiment of a method 2200 under the aspects described. The method commences at Start block 2201 and control proceeds to block 2210 for computing a scale factor for a motion vector predictor of a block of a picture. Control proceeds from block 2210 to block 2220 for performing motion vector rescaling and motion vector transformation on the motion vector predictor, in an order based on the scale factor. Control then proceeds from block 2220 to block 2230 for performing motion compensation on the block of a picture using the transformed and rescaled motion vector predictor. Control then proceeds from block 2230 to block 2240 for encoding the motion compensated block of video data.

Figure 23:
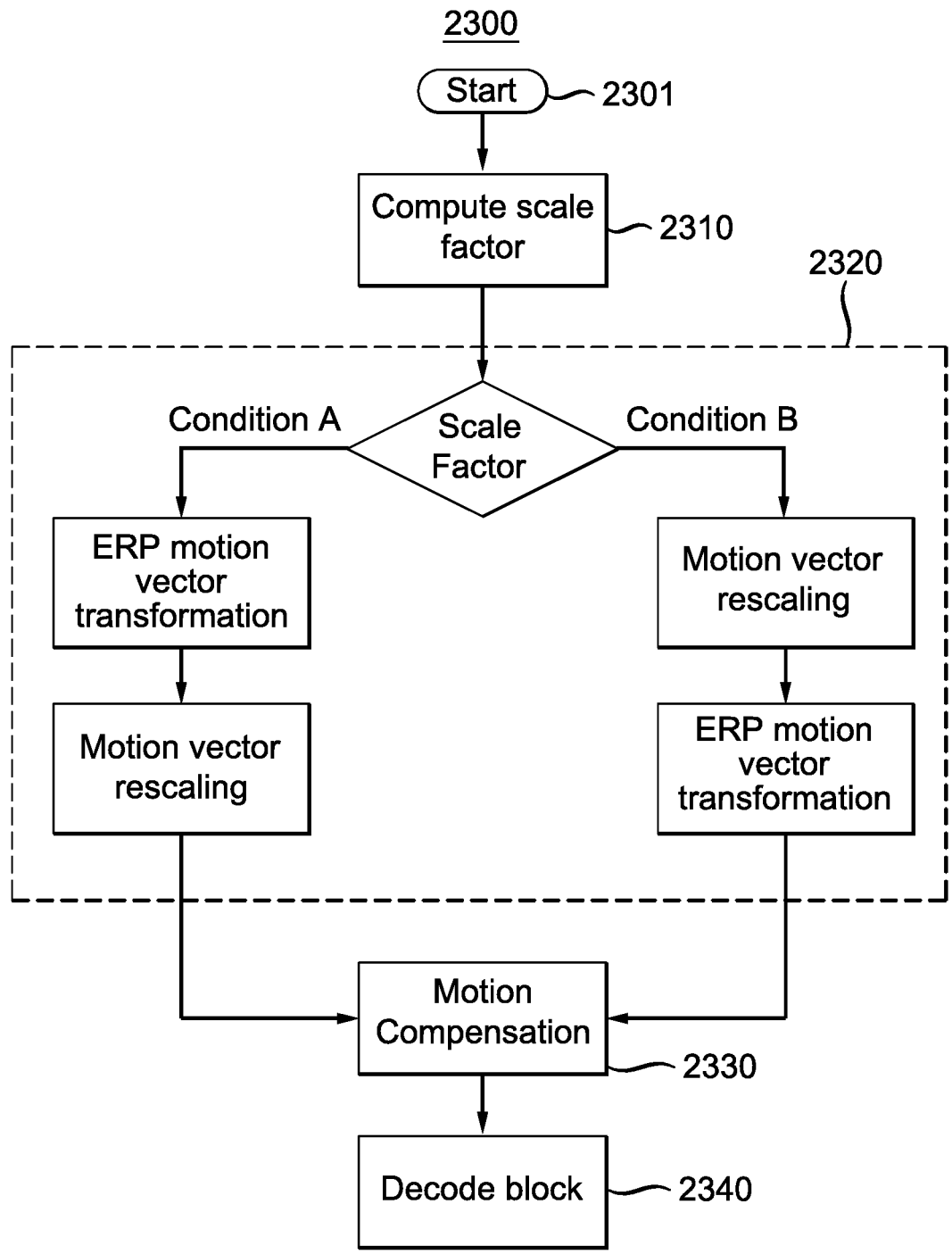
FIG. 23 illustrates one embodiment of a decoding method according to the described aspects.

FIG. 23 shows one embodiment of a method 2300 under the aspects described. The method commences at Start block 2301 and control proceeds to block 2310 for computing a scale factor for a motion vector predictor of a block of a picture. Control proceeds from block 2310 to block 2320 for performing motion vector rescaling and motion vector transformation on the motion vector predictor, in an order based on the scale factor. Control then proceeds from block 2320 to block 2330 for performing motion compensation on the block of a picture using the transformed and rescaled motion vector predictor. Control then proceeds from block 2330 to block 2340 for encoding the motion compensated block of video data.

Figure 24:
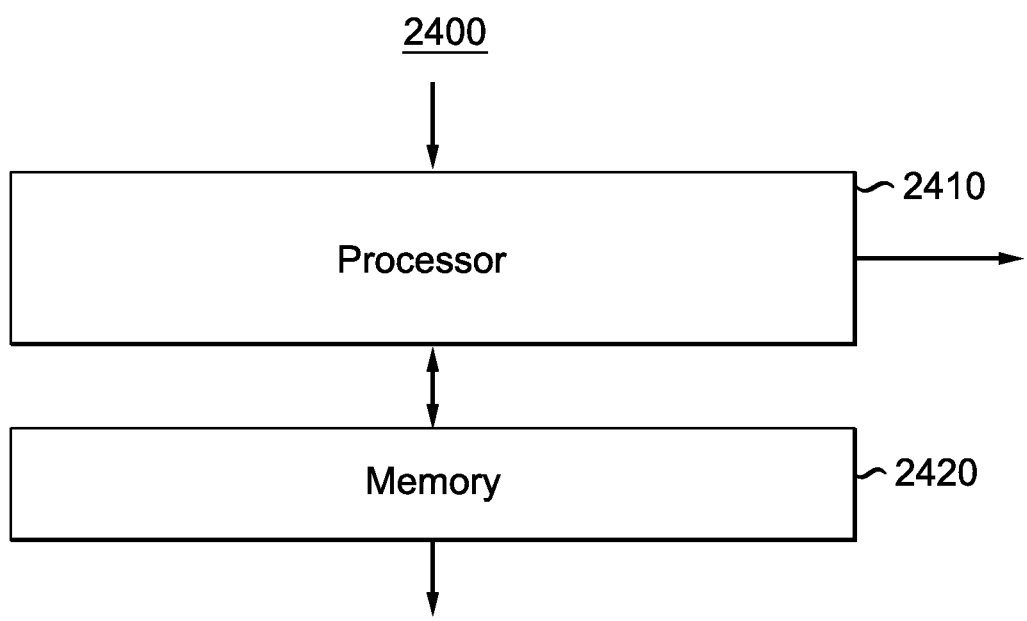
FIG. 24 illustrates one embodiment of an apparatus for encoding or decoding according to the described aspects.

FIG. 24 shows one embodiment of an apparatus 2400 for coding or decoding a block of video data. The apparatus comprises Processor 2410 which has input and output ports and is in signal connectivity with Memory 2420, also having input and output ports. The apparatus can execute any of the aforementioned method embodiments, or variations.

The functions of the various elements shown in the figures can be provided using dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage.

Other hardware, conventional and/or custom, can also be included. Similarly, any switches shown in the figures are conceptual only. Their function can be carried out through the operation of program logic, through dedicated logic, through the interaction of program control and dedicated logic, or even manually, the particular technique being selectable by the implementer as more specifically understood from the context.

The present description illustrates the present ideas. It will thus be appreciated that those skilled in the art will be able to devise various arrangements that, although not explicitly described or shown herein, embody the present ideas and are included within its scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which can be substantially represented in computer readable media and so executed by a computer or processor, whether or not such computer or processor is explicitly shown.

In the claims herein, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

In conclusion, a method and apparatus to adapt motion vector prediction that is suited to omnidirectional video is presented. One embodiment improves handling of temporal motion vector predictors or rescaled motion vector predictors. Another embodiment is suited to spatial motion vector predictors, and another to a combination of either temporal or spatial motion vector predictors. The method analyzes a scale factor derived from, at least one of, the time index of the predictor, the time index of ther reference image's predictor, the time index of a reference image's current block, and the time index of the current block. If, for example, the scale factor is greater than one, motion vector transformation is performed before motion vector rescaling. If, however, the scale factor is less than or equal to one, the motion vector rescaling is performed before motion vector transformation.

The invention claimed is:

1. A method, comprising:
   computing a scale factor for a motion vector predictor of a block of a two-dimensional picture corresponding to a projection of a three-dimensional surface representing an image of a large field of view video;
   upon condition that the scale factor is less than or equal to a threshold value of one, performing motion vector rescaling on said motion vector predictor based on the scale factor and then motion vector transformation on said rescaled motion vector predictor based on a projection function that maps the three-dimensional surface with at least the two-dimensional picture;
   upon condition that the scale factor is greater than the threshold value, performing motion vector transformation on said motion vector predictor based on the projection function and then motion vector rescaling on said transformed motion vector predictor based on the scale factor for said motion vector predictor;
   performing motion compensation on the block using said transformed and rescaled motion vector predictor; and
   encoding said motion compensated block of said picture.

2. The method of claim 1, wherein the motion vector transformation comprises:
   projecting, on the three-dimensional surface, a point P of the block to a point P''', a point V of another block to a point V''' and the point V of said another block displaced by a motion vector (dV) to a point W''';
   determining an intersection Vp between a vector OV''' and a plane G and an intersection Wp between a vector OW''' and a plane G, wherein the plane G is a plane tangent in P''' to the surface, O is an origin of a sphere;
   displacing P''' by dVp to obtain a point Qp in the plane G, wherein dVp is equal to a vector VpWp;
   projecting the point Qp in the picture to a point Q; and
   determining a current motion vector (dP) for said block as a vector from P to Q.

3. The method of claim 1, the motion vector transformation comprises:
   computing, in a projection space, a displacement of at least one point of said block using said motion vector predictor, obtaining a displaced point in the projection space;
   projecting onto the picture said displaced point; and
   computing an adjusted motion vector predictor as a difference between a location on the picture of said projected displaced point and said point of said current block;
   applying said motion vector predictor to an anchor point of said picture for obtaining a displaced anchor point;
   projecting, onto said projection space, said point of said block, said anchor point and said displaced anchor point; and
   computing, in said projection space, a projected motion vector predictor as a difference between said projected displaced anchor point and said projected anchor point, computing in said projection space a displacement of at least one point of said block being performed using said projected motion vector predictor.

4. The method of claim 1, wherein said scale factor is based on any of a time index of the motion vector predictor, a time index of a reference image predictor, a time index of a current block of a reference image, and/or a time index of a current block.

5. The method of claim 1, wherein the motion vector predictor is from a spatially neighboring block of said block.

6. The method of claim 1, wherein the motion vector is from a block of a reference frame already decoded or reconstructed.

7. The method of claim 1, wherein, for advanced temporal motion vector prediction, co-located sub-prediction unit motion vector predictors are also rescaled.

8. A non-transitory computer readable medium containing data content generated according to the method of claim 1, for playback using a processor.

9. A method, comprising:
   computing a scale factor for a motion vector predictor of a block of a two-dimensional picture corresponding to a projection of a three-dimensional surface representing an image of a large field of view video;
   upon condition that the scale factor is less than or equal to a threshold value of one, performing motion vector rescaling on said motion vector predictor based on the scale factor and then motion vector transformation on said rescaled motion vector predictor based on a projection function that maps the three-dimensional surface with at least the two-dimensional picture;
   upon condition that the scale factor is greater than the threshold value, performing motion vector transformation on said motion vector predictor based on the projection function and then motion vector rescaling on said transformed motion vector predictor based on the scale factor for said motion vector predictor;
   performing motion compensation on the block using said transformed and rescaled motion vector predictor; and
   decoding said motion compensated block of said picture.

10. A computer program product comprising instructions which, when the program is executed by a computer, cause the computer to carry out the method of claim 9.

11. The method of claim 9, wherein the motion vector transformation comprises:
    projecting, on the three-dimensional surface a point P of the block to a point P''' a point V of another block to a point V''' and the point V of said another block displaced by a motion vector (dV) to a point W''';
determining an intersection Vp between a vector OV''' and a plane G and an intersection Wp between a vector OW''' and a plane G, wherein the plane G is a plane tangent in P''' to the surface, O is an origin of a sphere;
displacing P''' by dVp to obtain a point Qp in the plane G, wherein dVp is equal to a vector VpWp;
projecting the point Qp in the picture to a point Q; and
determining a current motion vector (dP) for said block as a vector from P to Q.

12. The method of claim 9, wherein the motion vector transformation comprises:
computing, in a projection space, a displacement of at least one point of said block using said motion vector predictor, obtaining a displaced point in the projection space;
projecting onto the picture said displaced point; and
computing an adjusted motion vector predictor as a difference between a location on the picture of said projected displaced point and said point of said current block;
applying said motion vector predictor to an anchor point of said picture for obtaining a displaced anchor point;
projecting, onto said projection space, said point of said block, said anchor point and said displaced anchor point; and
computing, in said projection space, a projected motion vector predictor as a difference between said projected displaced anchor point and said projected anchor point, computing in said projection space a displacement of at least one point of said block being performed using said projected motion vector predictor.

13. The method of claim 9, wherein said scale factor is based on any of a time index of the motion vector predictor, a time index of a reference image predictor, a time index of a current block of a reference image, and/or a time index of a current block.

14. The method of claim 9, wherein the motion vector predictor is from a spatially neighboring block of said block.

15. The method of claim 9, wherein the motion vector predictor is from a block of a reference frame already decoded or reconstructed.

16. An apparatus for coding a block of video data, comprising:
a memory, and
a processor, configured to perform:
computing a scale factor for a motion vector predictor of a block of a two-dimensional picture corresponding to a projection of a three-dimensional surface representing an image of a large field of view video;
upon condition that the scale factor is less than or equal to a threshold value of one, performing motion vector rescaling on said motion vector predictor based on the scale factor and then motion vector transformation on said rescaled motion vector predictor based on a projection function that maps the three-dimensional surface with at least the two-dimensional picture;
upon condition that the scale factor is greater than the threshold value, performing motion vector transformation on said motion vector predictor based on the projection function and then motion vector rescaling on said transformed motion vector predictor based on the scale factor for said motion vector predictor;
performing motion compensation on the block using said transformed and rescaled motion vector predictor; and
encoding said motion compensated block of said picture.

17. The method of claim 16, wherein the motion vector predictor is from a spatially neighboring block of said block or from a block of a reference frame already decoded or reconstructed.

18. An apparatus for decoding a block of video data, comprising:
a memory, and
a processor, configured to perform:
computing a scale factor for a motion vector predictor of a block of a two-dimensional picture corresponding to a projection of a three-dimensional surface representing an image of a large field of view video;
upon condition that the scale factor is less than or equal to a threshold value of one, performing motion vector rescaling on said motion vector predictor based on the scale factor and then motion vector transformation on said rescaled motion vector predictor based on a projection function that maps the three-dimensional surface with at least the two-dimensional picture;
upon condition that the scale factor is greater than the threshold value, performing motion vector transformation on said motion vector predictor based on the projection function and then motion vector rescaling on said transformed motion vector predictor based on the scale factor for said motion vector predictor;
performing motion compensation on the block using said transformed and rescaled motion vector predictor; and
decoding said motion compensated block of said picture.

19. The method of claim 18, wherein the motion vector predictor is from a spatially neighboring block of said block or from a block of a reference frame already decoded or reconstructed.

* * * * *

UNITED STATES PATENT AND TRADEMARK OFFICE
CERTIFICATE OF CORRECTION

PATENT NO. : 11,076,166 B2
APPLICATION NO. : 16/647663
DATED : July 27, 2021
INVENTOR(S) : Franck Galpin, Tangi Poirier and Edouard Francois Page 1 of 1

It is certified that error appears in the above-identified patent and that said Letters Patent is hereby corrected as shown below:

In the Claims

In Claim 11, Column 16, Line 67, delete "P"'" and insert --P,--

In Claim 11, Column 16, Line 66, delete "surface" and insert --surface,--

Signed and Sealed this
Second Day of January, 2024

Katherine Kelly Vidal
*Director of the United States Patent and Trademark Office*